(12) United States Patent
Yang et al.

(10) Patent No.: US 10,292,115 B2
(45) Date of Patent: May 14, 2019

(54) ELECTRONIC DEVICE AND METHOD OF TRANSMITTING WIRELESS SIGNAL THEREOF

(71) Applicant: Samsung Electronics Co., Ltd., Gyeonggi-do (KR)

(72) Inventors: Dongil Yang, Gyeonggi-do (KR); Han-Yeop Lee, Gyeonggi-do (KR); Chaeman Lim, Seoul (KR); Hyo-Seok Na, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 0 days.

(21) Appl. No.: 15/805,425

(22) Filed: Nov. 7, 2017

(65) Prior Publication Data

US 2018/0132192 A1 May 10, 2018

(30) Foreign Application Priority Data

Nov. 7, 2016 (KR) .......................... 10-2016-0147597

(51) Int. Cl.
*H04W 52/24* (2009.01)
*H04B 7/0404* (2017.01)
(Continued)

(52) U.S. Cl.
CPC ........ *H04W 52/245* (2013.01); *H04B 7/0404* (2013.01); *H04B 7/0617* (2013.01);
(Continued)

(58) Field of Classification Search
CPC ... G01S 5/0054; G01S 5/0284; H04B 7/0404; H04B 7/0617; H04B 7/0682; H04W 52/245
(Continued)

(56) References Cited

U.S. PATENT DOCUMENTS

2003/0153358 A1* 8/2003 Moon .................. H04B 7/0811
455/561
2004/0171352 A1* 9/2004 Maeda ..................... H04B 1/10
455/67.13
(Continued)

FOREIGN PATENT DOCUMENTS

WO 2008/113031 A2 9/2008
WO 2013/006462 A1 1/2013

OTHER PUBLICATIONS

European Search Report dated Apr. 16, 2018.
European Search Report dated Mar. 14, 2019.

*Primary Examiner* — Tan H Trinh
(74) *Attorney, Agent, or Firm* — Cha & Reiter, LLC.

(57) ABSTRACT

Disclosed are an electronic device and a method of transmitting a wireless signal thereof. The electronic device includes: a housing; a first antenna configured to form a first part of the housing; a second antenna configured to form a second part of the housing; and at least one processor including a first transmission terminal and a second transmission terminal connected to the first antenna and the second antenna, respectively, wherein the at least one processor is further configured to identify a strength of at least one of a transmission signal and a reception signal when transmission of a wireless signal is requested, and control at least one of a phase and a strength of wireless signals output through the first transmission terminal and the second transmission terminal according to a result of the identification. Various other embodiments are possible.

21 Claims, 16 Drawing Sheets

(51) Int. Cl.
*H04B 7/06* (2006.01)
*G01S 5/00* (2006.01)
*G01S 5/02* (2010.01)

(52) U.S. Cl.
CPC .......... *H04B 7/0682* (2013.01); *G01S 5/0054* (2013.01); *G01S 5/0284* (2013.01)

(58) Field of Classification Search
USPC ........ 455/73, 553.1, 550.1, 443, 552.1, 436, 455/41.1, 41.2, 101, 102, 517, 67.13, 65, 455/85, 84, 226.1, 77, 561, 575.7; 370/328, 273, 297, 277, 310; 343/724, 343/758; 342/357.59, 357.69, 372
See application file for complete search history.

(56) References Cited

U.S. PATENT DOCUMENTS

| | | | | |
|---|---|---|---|---|
| 2004/0224719 A1* | 11/2004 | Nounin | ................... | H04B 1/406 455/553.1 |
| 2006/0058061 A1* | 3/2006 | Nakagawa | .......... | H04L 25/0204 455/553.1 |
| 2006/0089117 A1* | 4/2006 | Suzuki | ................. | H04B 7/0805 455/269 |
| 2006/0160496 A1* | 7/2006 | Murakami | ........... | H04B 7/0417 455/102 |
| 2006/0215797 A1* | 9/2006 | Takeuchi | ............... | H04N 9/315 375/371 |
| 2008/0280571 A1* | 11/2008 | Rofougaran | ............. | H01Q 3/26 455/77 |
| 2010/0117913 A1* | 5/2010 | Jung | ...................... | H01Q 1/246 343/724 |
| 2011/0075581 A1* | 3/2011 | Mihota | ................ | H04B 7/0682 370/252 |
| 2012/0105284 A1* | 5/2012 | Anandakumar | ...... | G01S 19/246 342/357.59 |
| 2013/0035051 A1* | 2/2013 | Mujtaba | ............... | H04B 7/0808 455/277.2 |
| 2013/0052964 A1* | 2/2013 | Husted | ................... | H04B 17/11 455/73 |
| 2013/0178181 A1* | 7/2013 | Pohlabeln | ............. | H01Q 1/242 455/226.1 |
| 2013/0235798 A1* | 9/2013 | Choi | ...................... | H04W 4/50 370/328 |
| 2013/0237272 A1* | 9/2013 | Prasad | ................. | H04B 7/0617 455/517 |
| 2014/0003300 A1* | 1/2014 | Weissman | ............ | H04B 7/0404 370/273 |
| 2014/0072019 A1* | 3/2014 | Kim | ......................... | H04B 1/44 375/219 |
| 2014/0113679 A1* | 4/2014 | Wehrnnann | .......... | H04B 1/0458 455/550.1 |
| 2014/0148095 A1* | 5/2014 | Smith | ...................... | H04B 5/02 455/41.1 |
| 2015/0099474 A1 | 4/2015 | Yarga et al. | | |
| 2016/0043781 A1* | 2/2016 | Cho | ...................... | H04L 5/0051 342/373 |
| 2016/0127016 A1 | 5/2016 | Pehlke et al. | | |

* cited by examiner ns. For example, the electronic devices may include at least
ELECTRONIC DEVICE AND METHOD OF TRANSMITTING WIRELESS SIGNAL THEREOF

CLAIM OF PRIORITY

This application claims priority under 35 U.S.C. § 119(a) to Korean Application Serial No. 10-2016-0147597, which was filed in the Korean Intellectual Property Office on Nov. 7, 2016, the entire content of which is hereby incorporated by reference.

TECHNICAL FIELD

The present disclosure relates to an electronic device and a method of transmitting a wireless signal thereof.

BACKGROUND

Electronic devices (for example, mobile terminals, smart phones, and wearable electronic devices) may provide various functions. For example, smart phones may provide not only a basic telephone service but also a short-range wireless communication (Bluetooth, Wi-Fi, or Near Field Communication (NFC)), a cellular communication (3G, 4G, or 5G), music or video reproduction, a camera/video recorder, a navigation, and a messaging.

The electronic devices may include a plurality of antennas. For example, the electronic devices may include at least one mobile communication antenna for cellular communication, a Wi-Fi antenna for Wi-Fi communication, a Bluetooth antenna for Bluetooth communication, and a Global Positioning System (GPS) antenna for receiving satellite positioning signals. The electronic devices may include a plurality of antennas according to the frequency bands supported thereby. Alternatively, the electronic devices may use the Wi-Fi antennas or the GPS antennas as the mobile communication antennas.

SUMMARY

When electronic devices include a plurality of antennas, the electronic devices may perform control to transmit/receive wireless signals through at least one antenna according to some condition (for example, a frequency band, a signal strength, or a status of the electronic device). For example, in the state in which a first antenna is located on an upper part of the electronic device and a second antenna is located on a lower part thereof, when the performance of the second antenna is reduced to a predetermined value or lower because it is being held by the user while a wireless signal is transmitted through the second antenna, the electronic device may perform switching such that the wireless signal is transmitted/received through the first antenna.

When the electronic device performs an antenna switching operation, a problem of reduction in radiation performance may occur. For example, when transmission of the wireless signal is momentarily disconnected in the antenna-switching operation during a call, a call drop may occur. In another example, when the radiation efficiency of the first antenna is lower than that of the second antenna, the radiation performance of the electronic device (for example, Total Radiated Power (TRP)) may be reduced. In yet another example, since a path between elements (for example, a communication processor and a transmission/reception separator) for wireless communication of the electronic device becomes longer, path loss may occur, and thus the radiation performance may be reduced.

Various embodiments of the present disclosure to solve the above-described problems may provide an electronic device for transmitting wireless signals through a plurality of antennas and a method of transmitting wireless signals thereof.

In accordance with an aspect of the present disclosure, an electronic device is provided. The electronic device includes: a housing; a first antenna configured to form a first part of the housing; a second antenna configured to form a second part of the housing; and at least one processor including a first transmission terminal and a second transmission terminal connected to the first antenna and the second antenna, respectively, wherein the at least one processor is further configured to identify a strength of at least one of a transmission signal and a reception signal when transmission of a wireless signal is requested, and control at least one of a phase and a strength of wireless signals output through the first transmission terminal and the second transmission terminal according to a result of the identification.

In accordance with another aspect of the present disclosure, an electronic device is provided. The electronic device includes: a housing; a first antenna configured to form a first part of the housing; a second antenna configured to form a second part of the housing; and at least one processor including a plurality of reception terminals for receiving wireless signals through the first antenna and the second antenna and one transmission terminal for outputting a wireless signal to be output through at least one of a plurality of antennas, wherein the at least one processor is further configured to identify a strength of at least one of a transmission signal and a reception signal when transmission of a wireless signal is requested, and transmit the transmission signal, which is output through the transmission terminal, through the first antenna via a first path or to transmit and output the transmission signal to the first antenna and the second antenna through the first path or a second path for changing at least one of a phase and a strength of the transmission signal.

In accordance with another aspect of the present disclosure, there is presented an electronic device comprising a housing defining a plane, the housing having a front surface and a rear surface; a Global Navigation Satellite System (GNSS) module disposed within the housing, the GNSS configured to determine a location of the electronic device; a magnetic sensor configured to determine a direction that the rear surface of the housing faces; a location information reception module for determining a direction from the location of the electronic device to an access point; memory storing a plurality of angles, and a corresponding plurality of phases strength levels; an application processor configured to retrieve one of the corresponding plurality of phases and strength levels based on an offset angle between the direction from the location of the electronic device toward the access point and the direction that the rear surface of the housing faces; and a communication processor configured to transmit a first transmission signal using a first antenna and a second transmission signal using a second antenna with the one of the corresponding plurality of phases and strength levels.

In accordance with another aspect of the present disclosure, a method of transmitting a wireless signal by an electronic device comprising a first antenna and a second antenna is provided. The method includes: identifying a strength of at least one of a transmission signal and a reception signal in response to a request to transmit a wireless signal; and controlling at least one of a phase and a strength of at least one transmission signal output from a communication processor based on a result of the identification.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
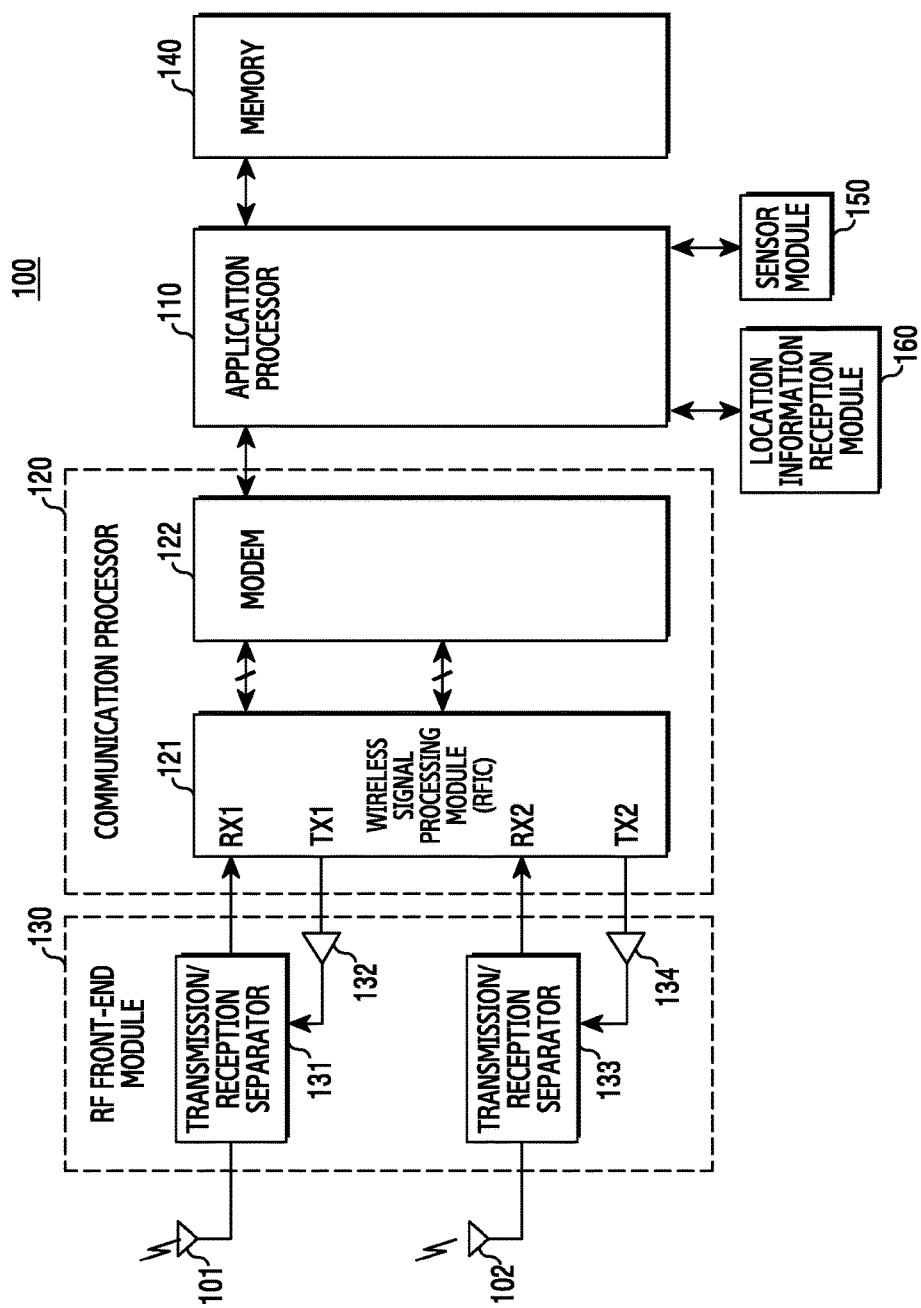
FIG. 1 is a block diagram illustrating the configuration of an electronic device according to an embodiment of the present disclosure.

Various example embodiments of the present disclosure are described in greater detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" include plural referents unless the context clearly dictates otherwise. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance, and do not limit corresponding elements. The expressions may be used for distinguishing one element from another element, but do not imply a temporal relationship. When it is described that an element (such as a first element) is operatively or communicatively "coupled to" or "connected to" another element (such as a second element), the element can be directly connected to the other element or can be connected through another element (such as a third element).

The expression "configured to (or set)", as used in the present disclosure, may be used interchangeably with, for example, "suitable for," "having the capacity to," "designed to," "adapted to," "made to," or "capable of" according to the situation. The term "configured to (or set)" does not only refer to "specifically designed to" by hardware. Alternatively, in some situations, the expression "apparatus configured to" may refer to a situation in which the apparatus "can" operate together with another apparatus or component. For example, the phrase "a processor configured (or set) to perform A, B, and C" may be, for example, and without limitation, a dedicated processor, a generic-purpose processor (such as a central processing (CPU) or an application processor (AP)) that can perform a corresponding operation by executing at least one software program stored at an exclusive processor (such as an embedded processor) for performing a corresponding operation or at a memory device.

An electronic device, according to embodiments of the present disclosure, may be embodied as, for example, at least one of a smart phone, a tablet PC, a mobile phone, a video phone, an e-book reader, a desktop PC, a laptop PC, a notebook computer, a workstation, a server, a PDA, a portable multimedia player (PMP), an MPEG 3 (MP3) player, medical equipment, a camera, and a wearable device, or the like, but is not limited thereto. The wearable device can include at least one of an accessory type (e.g., a watch, a ring, a bracelet, an ankle bracelet, a necklace, glasses, a contact lens, or a head-mounted-device (HMD)), a fabric or clothing embedded type (e.g., electronic garments), a body attachable type (e.g., a skin pad or a tattoo), and an implantable circuit, or the like, but is not limited thereto. The electronic device may be embodied as at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box, an electronic dictionary, an electronic key, a camcorder, and an electronic frame, or the like, but is not limited thereto.

In another embodiment, the electronic device may be embodied as at least one of various medical devices (such as, various portable medical measuring devices (a blood sugar measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for ship (such as, a navigation device for ship and gyro compass), avionics, a security device, a head unit for a vehicle, an industrial or home robot, a drone, an automated teller machine (ATM) of a financial institution, a point of sales (POS) device of a store, and an Internet of things (IoT) device (e.g., a light bulb, various sensors, a sprinkler device, a fire alarm, a thermostat, a street light, a toaster, sports equipment, a hot water tank, a heater, and a boiler), or the like, but is not limited thereto.

According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device), or the like, but is not limited thereto. An electronic device, according to an embodiment, can be a flexible electronic device or a combination of two or more of the foregoing various devices. An electronic device is not limited to the foregoing devices may be embodied as a newly developed electronic device. The term "user", as used herein, can refer to a person using an electronic device or a device using an electronic device (e.g., an artificial intelligence electronic device).

FIG. 1 is a block illustrating the configuration of an electronic device according to an embodiment of the present disclosure, and FIGS. 2A to 2D illustrate a configuration for modulating a phase of a transmission signal of the electronic device according to an embodiment of the present disclosure.

Figure 2A:
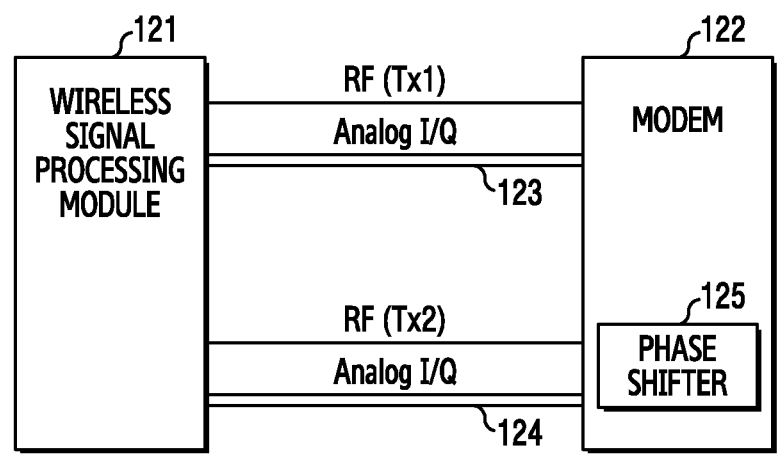
FIG. 2A, FIG. 2B, FIG. 2C and FIG. 2D illustrate in detail a configuration for modulating a phase of a transmission signal of the electronic device according to an embodiment of the present disclosure.
Figure 2B:
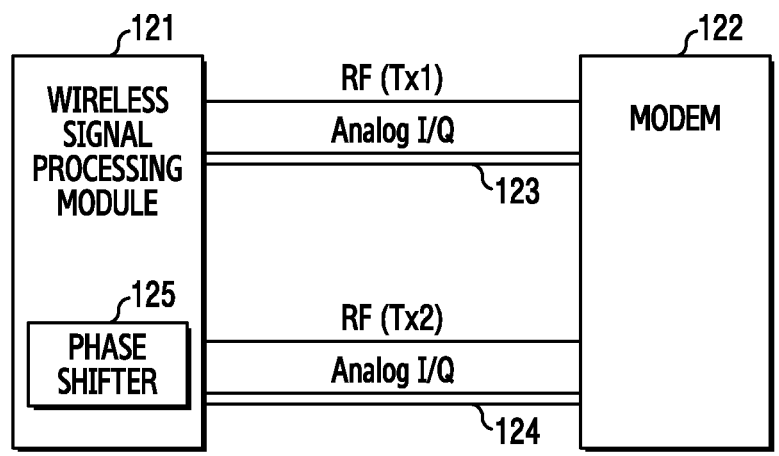
Figure 2C:
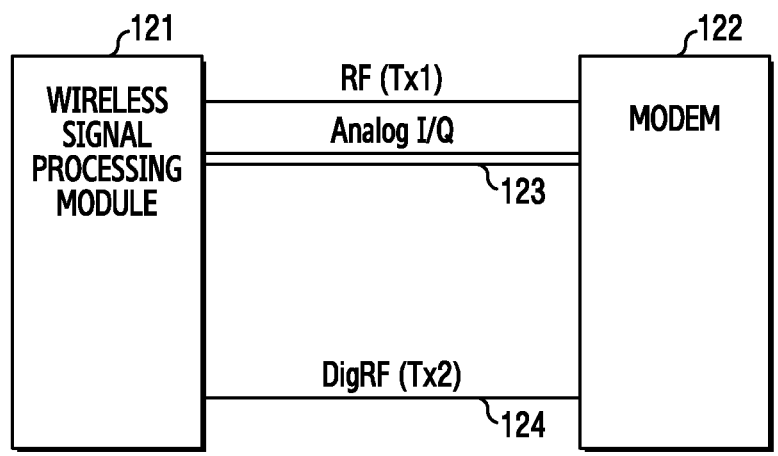
Figure 2D:
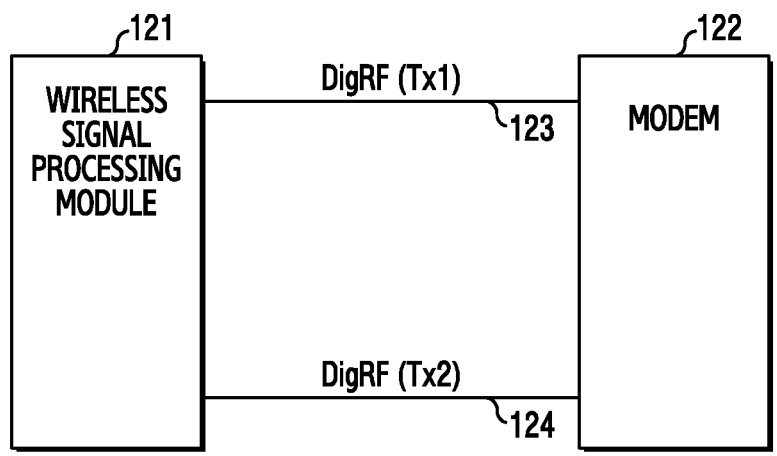

Referring to FIGS. 1 to 2D, an electronic device 100 according to an embodiment of the present disclosure may include an application processor 110, a communication processor 120, a Radio-Frequency (RF) front-end module 130, a memory 140, a sensor module 150, and a location information reception module 160.

The application processor 110 is configured to maximize the quality of the radio communications by pointing the radiation direction of the signal transmission directly at a communicating node such as a base station. Application processor 110 can control the direction of the radiation direction by selecting a particular one of the antennas 101, 102 or both. The selection of the antennas 101, 102 can be based on the reception signal is less than or equal to a threshold, or whether the transmitted signal is greater than or equal to a threshold.

In certain embodiments, the application processor 110 can transmit a first signal using one antenna 101 and a second signal using one antenna 102 (or vice versa). The second signal can be a duplicate of the first transmission signal, but for lower amplitude and a phase difference. By controlling the phase difference, the application processor 110 can control the direction of the main lobe of the radiation (the radiation direction), causing the radiation direction to point directly at the access point.

The application processor 110 may control the overall operation of the electronic device 100. In other words, the application processor 110 may control each element of the electronic device 100. For example, the application processor 110 may receive executable instructions from the memory 140 and control each element according to the received instructions, so as to perform various functions.

The application processor 110 may be configured as a single-core processor or a multi-core processor. Alternatively, the application processor 110 may be of a multi-processor type including a plurality of processors. For example, the application processor 110 may include a first processor of high performance/high power and a second processor of low performance/low power.

According to various embodiments, the application processor 110 may control the wireless signal transmission. For example, the application processor 110 may control the wireless signal transmission procedure when a phone call request (a voice call or a video call) or a request for uploading multimedia data (a picture, a video, or a document) occurs.

The application processor 110 may control the wireless signal transmission based on the strength of a reception signal or a transmitted signal. For example, the application processor 110 may cause transmission of a wireless signal through a plurality of antennas when the strength of the reception signal is less than or equal to a preset threshold value (for example, −90 decibel-milliwatts (dBm)). In another example, the application processor 110 may perform cause transmission of a wireless signal through the plurality of antennas when the transmitted signal strength is greater than or equal to a preset threshold value (for example, 20 dBm). Hereinafter, for convenience of description, description of the control of transmission is based on the strength of the reception signal, though it shall be understood that control can be conversely performed based on the strength of the transmission signal.

The application processor 110 may measure the strength of the reception signal or receive the strength of the reception signal from the communication processor 120. When the strength of the reception signal is greater than or equal to a preset threshold value (for example, −90 dBm), the application processor 110 may command the communication processor 120 to transmit a wireless signal through one (for example, a first antenna 101) of a plurality of antennas. The first antenna 101 may be a main antenna. The first antenna 101 may be located at a first part (for example, a lower end) of the electronic device. For example, the first antenna 101 may form a first part of a housing, or may be located within the housing adjacent to the first part of the housing.

When the strength of the reception signal is less than or equal to the preset threshold value (for example, −90 dBm), the application processor 110 may control the communication processor 120 to transmit a wireless signal through a plurality of antennas. For example, the application processor 110 may command the communication processor 120 to transmit a first transmission signal through the first antenna 101 among the plurality of antennas and to transmit a second transmission signal through a second antenna 102. The second antenna 102 may be a sub-antenna. The second antenna 102 may be located at a second part (for example, an upper end) of the electronic device. For example, the second antenna 102 may form a second part of the housing or may be located within the housing adjacent to the second part of the housing. The second transmission signal may be the same signal as the first transmission signal, but may have a different phase and/or a different strength/amplitude.

When wireless signals are transmitted through the plurality of antennas, the application processor 110 may identify a radiation direction. Specifically, the application processor 110 may detect a position (state) of the electronic device based on various pieces of sensor information collected from the sensor module 150 and identify a radiation direction at the detected position. Further, the application processor 110 may identify a main lobe direction in the state in which the first transmission signal and the second transmission signal have a default phase. The radiation direction is the direction of the main lobe.

One way that the application processor 110 can determine the radiation direction is to use the sensors to determine the direction of the rear surface of the housing. For example, in a smartphone, the rear surface could be the surface that is opposite the display. The rear surface direction can be the direction of an orthogonal line emerging from the center of the rear surface. After determining the rear surface direction, the application processor 110 can determine an angle that the main lobe makes with the rear surface direction. For example, if the rear surface direction is North, and the direction of the main lobe is orthogonal to the rear surface, the radiation direction is also North. If the direction of the main lobe is +30 degrees from the rear surface direction, than the radiation direction can be considered +30 degrees from North.

The application processor 110 may identify information about the direction of an access point such as a Base Station (BS). For example, the application processor 110 may receive and compare location information of the BS and location information of the electronic device and identify a relative direction (hereinafter, referred to as a BS direction) of the BS with respect to the electronic device based on a result of the comparison. When the radiation direction does not match the BS direction, the application processor 110 may control a beam pattern such that the radiation direction matches the BS direction, or points directly to the BS, by commanding the communication processor 120 to adjust a phase (or time) and/or a strength/amplitude of at least one of the first transmission signal and the second transmission signal.

The communication processor 120 may perform a wireless communication function, such as generation and modulation of a carrier wave or demodulation. The communication processor 120 according to an embodiment of the present disclosure may include a wireless-signal-processing module 121 and a modulator/demodulator (modem) 122.

The modem 122 may modulate a signal (for example, transmission signal) transmitted from the application processor 110 and transmit the modulated transmission signal to the wireless-signal-processing module 121. Alternatively, the modem 122 may demodulate the signal (for example, reception signal) received from the wireless-signal-processing module 121 and transmit the demodulated reception signal to the application processor 110.

The modem 122 may perform on/off control of a first transmission terminal (TX1) and a second transmission terminal (TX2) of the wireless-signal-processing module 121. For example, when a strength of the reception signal is greater than a threshold value, the modem 122 may transmit an instruction to turn on/off the output of the first transmission terminal (TX1) according to a transmission period and turn off the output of the second transmission terminal (TX2) to the wireless-signal-processing module 121. On the other hand, when the strength of the reception signal is less than or equal to the threshold value, the modem 122 may transmit an instruction to turn on/off the output of the first transmission terminal (TX1) and the second transmission terminal (TX2) according to a transmission period to the wireless-signal-processing module 121.

The wireless-signal-processing module 121 may up-convert the modulation signal (transmission signal) received from the modem 122 to a wireless signal. Alternatively, the wireless-signal-processing module 121 may down-convert the signal (reception signal) received from the RF front-end module 130 into a baseband signal and transmit the down-converted signal to the modem 122.

The wireless-signal-processing module 121 according to an embodiment of the present disclosure may include a plurality of reception terminals. For example, the wireless-signal-processing module 121 may include a first reception terminal (RX1) and a second reception terminal (RX2). However, embodiments of the present disclosure are not limited thereto, and the wireless-signal-processing module 121 may include three or more reception terminals. The wireless-signal-processing module 121 according to an embodiment of the present disclosure may receive a signal through the first reception terminal (RX1), or may receive a signal through the first reception terminal (RX1) and the second reception terminal (RX2).

The wireless-signal-processing module 121 according to an embodiment of the present disclosure may include a plurality of transmission terminals. For example, the wireless-signal-processing module 121 may include a first transmission terminal (TX1) and a second transmission terminal (TX2). However, embodiments of the present disclosure are not limited thereto, and the wireless-signal-processing module 121 may include three or more transmission terminals.

The wireless-signal-processing module 121 according to an embodiment of the present disclosure may output the first transmission signal through the first transmission terminal (TX1), or may output the first transmission signal and the second transmission signal through the first transmission terminal (TX1) and the second transmission terminal (TX2), respectively, according to the instruction transmitted from the modem 122. The second transmission signal may be the same signal as the first transmission signal or may be a signal having a phase and/or a strength different from that of the first transmission signal.

The wireless-signal-processing module 121 and the modem 122 may be connected through a plurality of interface lines. The interface lines may include an interconnection, a bus, a mailbox, or queues. For example, as illustrated in FIGS. 2A to 2D, the wireless-signal-processing module 121 and the modem 122 may be connected through a first interface line 123 for the first transmission signal and a second interface line 124 for the second transmission signal.

The first interface line 123 and the second interface line 124 may conform to an analog IQ that represents complex baseband signals into analog voltage (e.g., differential voltage between an inphase signal I and a cophase signal Q) or currents. or a DigRF interface standard of the Mobile Industry Processor Interface working group, such as DigRF version 1.12, 3.09, or 4, each of which are incorporated herein by reference. For example, as illustrated in FIGS. 2A and 2B, the first interface line 123 and the second interface line 124 may conform to the analog IQ interface standard. A phase shifter 125 for shifting the phase of the second transmission signal may be included in the modem 122, as illustrated in FIG. 2A, or may be included in the wireless-signal-processing module 121, as illustrated in FIG. 2B.

According to some embodiments, as illustrated in FIG. 2C, the first interface line 123 may conform to the analog IQ standard and the second interface line 124 may conform to the DigRF interface standard. Alternatively, as illustrated in FIG. 2D, the first interface line 123 and the second interface line 124 may both conform to the DigRF interface standard.

As illustrated in FIGS. 2C and 2D, when the second interface line for the second transmission signal conforms to the DigRF standard, the phase shifter 125 is not required.

The RF front-end module 130 may include a transmission/reception separators 131, 133 for separating the wireless signal into a transmission signal and a reception signal and a power amplifiers 132, 134 for amplifying the transmission signal.

The transmission/reception separator may be implemented as a duplexer, a diplexer, or an antenna switch module. The transmission/reception separator according to an embodiment of the present disclosure may include a first transmission/reception separator 131 and a second transmission/reception separator 133. The first transmission/reception separator 131 may separate the wireless signal transmitted/received through the first antenna 101 into the first transmission signal and the first reception signal. The second transmission/reception separator 133 may separate the wireless signal transmitted/received through the second antenna 102 into the second transmission signal and the second reception signal.

The power amplifiers may include a first power amplifier 132 and a second power amplifier 134. The first power amplifier 132 may amplify the first transmission signal. The second power amplifier 134 may amplify the second transmission signal. When the strength of the reception signal is larger than a threshold value, the first power amplifier 132 may be activated and the second power amplifier 134 may be deactivated. On the other hand, when the strength of the reception signal is equal to or smaller than the threshold value, the first power amplifier 132 and the second power amplifier 134 may be activated.

According to some embodiments, when it is required to provide transmission diversity even though the strength of the reception signal is larger than the threshold value, the first power amplifier 132 and the second power amplifier 134 may be activated. For example, although the strength of the reception signal is larger than the threshold value when a large amount of data is uploaded, the first power amplifier 132 and the second amplifier 134 may be activated.

Meanwhile, although not illustrated in FIG. 1, the RF front-end module 130 may further include elements such as an RF switch, a low-noise amplifier, a transmission SAW filter, a reception SAW filter, or a matching circuit.

The memory 140 may store various programs for operating the electronic device 100 and may also store data created or downloaded during the execution of various programs. Further, the memory 140 may store various commands and/or instructions for operating the application processor 110 or the communication processor 120. The memory 140 may include at least one of an internal memory and an external memory.

The memory 140 according to an embodiment of the present disclosure may store a program for controlling the operation of transmitting the wireless signal. The program may include a routine for controlling the transmission of the wireless signal to a single antenna or multiple antennas according to the strength of the reception signal, a routine for identifying a radiation direction of the electronic device, and a routine for controlling a phase and/or a strength of at least one of a plurality of transmission signals such that the radiation direction matches a BS direction.

The memory 140 according to an embodiment of the present disclosure may store information on a radiation direction when the first transmission signal and the second transmission signal have the default phase. The radiation direction may refer to a main lobe direction. Further, the memory 140 may store a phase information DataBase (DB) that stores phase information of the first transmission signal and the second transmission signal for changing the radiation direction.

In certain embodiments, the memory 140 can store a table having a plurality of angles. The angles can be associated with phase and signal values for both the first transmission signal and the second transmission signal. When the first transmission signal has the first strength and first phase value, and the second transmission signal has the second strength and second phase value, the main lobe will form the angle associated with strength and phase values with a particular direction of the electronic device, such as the direction of the rear surface. The sensor module 150 may include various sensors for identifying the orientation of the electronic device 100 (such as the direction of the rear surface). For example, the sensor module 150 may include an illumination sensor, a gyro sensor, an acceleration sensor, a geomagnetic sensor, or an atmospheric pressure sensor. The sensor module 150 may transmit various sensing information to the application processor 110. For example, when the strength of the reception signal is equal to or smaller than the threshold value, the sensor module 150 may be activated, and may transmit collected sensing information to the application processor 110. At this time, the application processor 110 may recognize the orientation of the electronic device based on the received sensing information.

According to some embodiments, the sensor module 150 may recognize the orientation of the electronic device 100 based on various sensing information and transmit the recognized orientation information to the application processor 110.

The location information reception module 160 may receive location information of the electronic device 100. For example, the location information reception module 160 may include a Global Navigation Satellite System (GNSS) receiver. The GNSS may be, for example, a Global Positioning System (GPS) receiver, a global navigation satellite system (GLONASS) receiver, a BeiDou navigation satellite system (hereinafter, referred to as "BeiDou") receiver, or Galileo (the European global satellite-based navigation system) receiver.

The location information reception module 160 according to an embodiment of the present disclosure may receive location information when a transmission diversity function of transmitting a wireless signal through a plurality of antennas is activated.

According to some embodiments, the location information of the electronic device 100 may include location information of an Access Point (AP) located near the electronic device 100 or location information of a particular place (for example, home, office, theater, or department store) at which an AP is installed. The location information of the Access Point can be obtained in a variety of ways. For example, the Access Point can communicate this information as part of its routine signaling. The Access Point can communicate its BSSID, from which the electronic device can determine the location of the Access Point. The location information of the electronic device 100 may be used to recognize the BS direction. For example, the electronic device 100 may compare location information of the BS and location information of the electronic device 100 to determine a compass direction (North, East, South, West) from the electronic device 100 and the Access Point, or vice versa. The compass direction to the Access Point can be considered the BS direction. The orientation of the electronic device can be used to determine the rear surface direction. The offset between the rear surface direction and the BS direction forms an offset angle. The Application Processor 110 can look up the offset angle in the table stored in the memory 140 and retrieve the phases and signal strengths associated with the offset angle (round the offset angle, or use the angle nearest the offset angle, or interpolate between the angles that are adjacent to the offset angle). Since the phases and signals cause the main lobe to form the associated angle with the rear surface direction, the main lobe will have the same direction as the BS direction and directly face the Access Point.

Meanwhile, although not illustrated in FIG. 1, the electronic device 100 may not include some of the described elements. Alternatively, the electronic device 100 may further include at least one other element (for example, a digital broadcasting module, a fingerprint recognition sensor, an audio processing module, an input device, or a display device) at the same level as the described elements.

Figure 3:
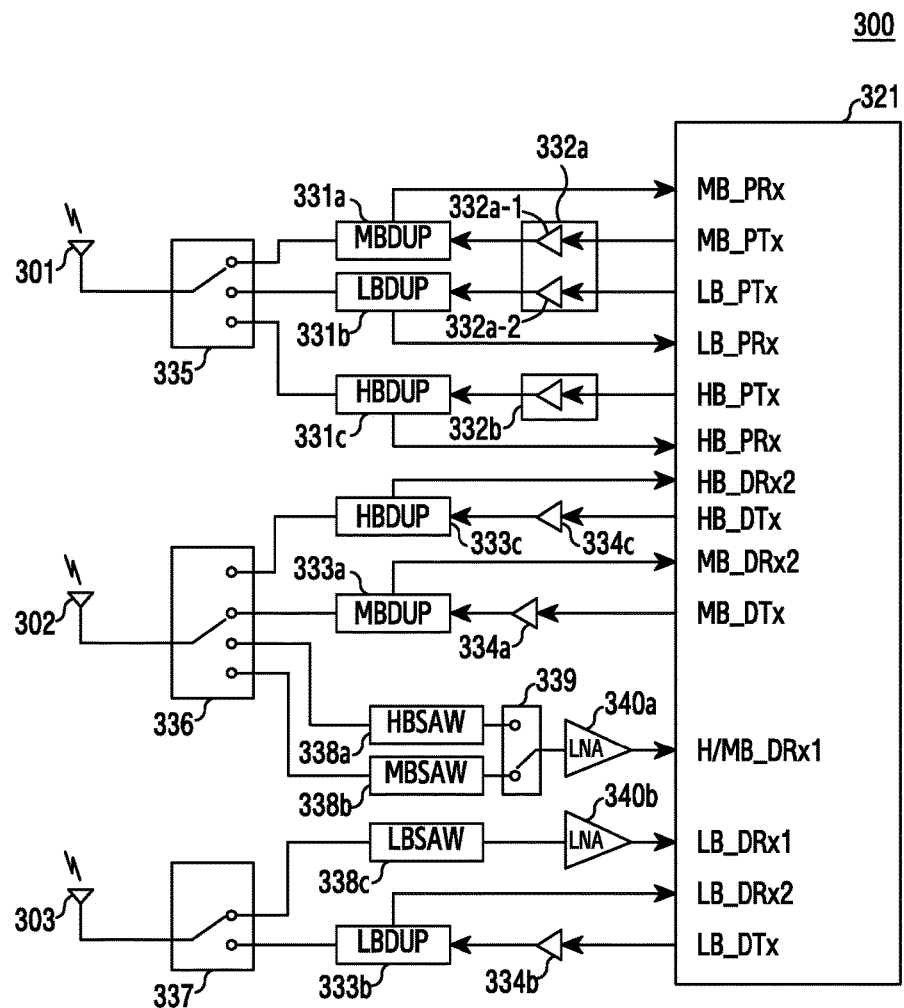
FIG. 3 is a block diagram illustrating the configuration of an electronic device that supports multiple bands according to an embodiment of the present disclosure.

FIG. 3 is a block diagram illustrating the configuration of the electronic device that supports multiple bands according to an embodiment of the present disclosure.

Referring to FIG. 3, an electronic device 300 according to an embodiment of the present disclosure may support multiple bands. For example, the electronic device 300 may support a high band (for example, a frequency band higher than or equal to 2.3 GHz), a middle band (for example, a frequency band ranging from 1.5 GHz to 2.3 GHz), and a low band (for example, a frequency band ranging from 600 MHz to 1.5 GHz).

As the electronic device 300 supports the multiple bands, the wireless-signal-processing module 321 may include a high-band first transmission signal terminal (HB_PTX), a middle-band first transmission signal terminal (MB_PTX), and a low-band first transmission signal terminal (LB_PTX). Further, the wireless-signal-processing module 321 may include a high-band first reception signal terminal (HB_PRX), a middle-band first reception signal terminal (MB_PRX), and a low-band first reception signal terminal (LB_PRX). The wireless-signal-processing module 321 may include a high-band second transmission signal terminal (HB_DTX), a middle-band second transmission signal terminal (MB_DTX), and a low-band second transmission signal (LB_DTX). The wireless-signal-processing module 321 may include a high/middle-band second reception signal terminal (H/MB_DRX1), a high-band second reception signal terminal (HB_DRX2), a middle-band second reception signal terminal (MB_DRX2), and low-band second reception signal terminals (LB_DRX1 and LB_DRX2).

A first power amplifier 332a-1, a second power amplifier 332a-2, and a third power amplifier 332b may be connected to the middle-band first transmission signal terminal (MB_PTX), the low-band first transmission signal terminal (LB_PTX), and the high-band first transmission signal terminal (HB_PTX), respectively.

FIG. 3 illustrates that the first power amplifier 332a-1 and the second power amplifier 332a-2 are implemented as one power amplifier module 332a and that the third amplifier 332b is separately implemented. However, embodiments of the present disclosure are not limited thereto. For example, the first power amplifier 332a-1, the second power amplifier 332a-2, and the third power amplifier 332b may be implemented as a single power amplification module, or may be implemented separately.

One of the sides of transmission/reception separators may be connected to the power amplifiers. The first transmission/reception separator 331a may be connected to the first power amplifier 332a-1. The second transmission/reception separator 331b may be connected to the second power amplifier 332a-2. The third transmission/reception separator 331c may be connected to the third power amplifier 332b. The other side of the transmission/reception separators may be connected to reception signal terminals. The first transmission/reception separator 331a may be connected to the middle-band first reception signal terminal (MB_PRX). The second transmission/reception separator 331b may be connected to the low-band first reception signal terminal (LB_PRX). The third transmission/reception separator 331c may be connected to the high-band first reception signal terminal (HB_PRX), respectively.

A first switch 335 may perform switching such that the first antenna 301 is connected to one of the first transmission/reception separator 331a, the second transmission/reception separator 331b, and the third transmission/reception separator 331c according to a control signal (not shown). The control signal (not shown) may be transmitted to a modem.

A fourth power amplifier 334a may be connected to the middle-band second transmission signal terminal (MB_DTX). A fifth power amplifier 334b may be connected to the low-band second transmission signal terminal (LB_DTX). The sixth power amplifier 334c, may be connected to the high-band second transmission signal terminal (HB_DTX).

One of the sides of a fourth transmission/reception separator 333a, a fifth transmission/reception separator 333b, and a sixth transmission/reception separator 333c may be connected to the fourth power amplifier 334a, the fifth power amplifier 334b, and the sixth power amplifier 334c, respectively. The other side of the fourth transmission/reception separator 333a, the fifth transmission/reception separator 333b, and the sixth transmission/reception separator 333c may be connected to the middle-band second reception signal terminal (MB_DRX2), the low-band second reception signal terminal (LB_DRX2), and the high-band second reception signal terminal (HB_DRX2), respectively.

Each of a first filter 338a, a second filter 338b, and a third filter 338c may be a filter for removing noise of the second reception signal, that is, a Surface Acoustic Wave (SAW) filter. The first filter 338a may remove noise from the second reception signal in the high band, the second filter 338b may remove noise from the second reception signal in the middle band, and the third filter 338c may remove noise from the second reception signal in the low band.

A first low-noise amplifier 340a may be connected to the high/middle-band second reception signal terminal (H/MB_DRX1). The first low-noise amplifier 340a may low-noise amplify the second reception signal in the high band or the middle band received through a second antenna 302.

A fourth switch 339 may perform switching such that the first filter 338a or the second filter 338b is connected to the first low-noise amplifier 340a in response to a control signal. The control signal may be transmitted from a modem.

A second switch 336 may perform switching such that the second antenna 302 is connected to the fourth transmission/reception separator 333a, the sixth transmission/reception separator 333c, the first filter 338a, or the second filter 338b. A control signal for controlling the switching of the second switch 336 may be received from the modem.

One side of a second low-noise amplifier 340b may be connected to the low-band reception signal terminal (LB_DRX1). The other side of the second low-noise amplifier 340b may be connected to the third filter 338c. The second low-noise amplifier 340b may low-noise amplify the second reception signal in the low band received through a third antenna 303 and the third filter 338c.

A third switch 337 may perform switching such that the third antenna 303 is connected to the third filter 338c or the fifth transmission/reception separator 333b. A control signal for controlling the switching of the second switch 337 may be received from the modem.

The electronic device 300 may further include a low-noise amplifier for low-noise amplifying the high-band first reception signal (HB_PRX), the middle-band first reception signal (MB_PRX), and the low-band first reception signal (LB_PRX) received through the first antenna 301, a low-noise amplifier for low-noise amplifying the high-band second reception signal (HB_DRX2) and the middle-band second reception signal (MB_DRX2) received through the second antenna 302, and a low-noise amplifier for low-noise amplifying the low-band second reception signal (LB_DRX2) received through the third antenna 303.

Figure 4:
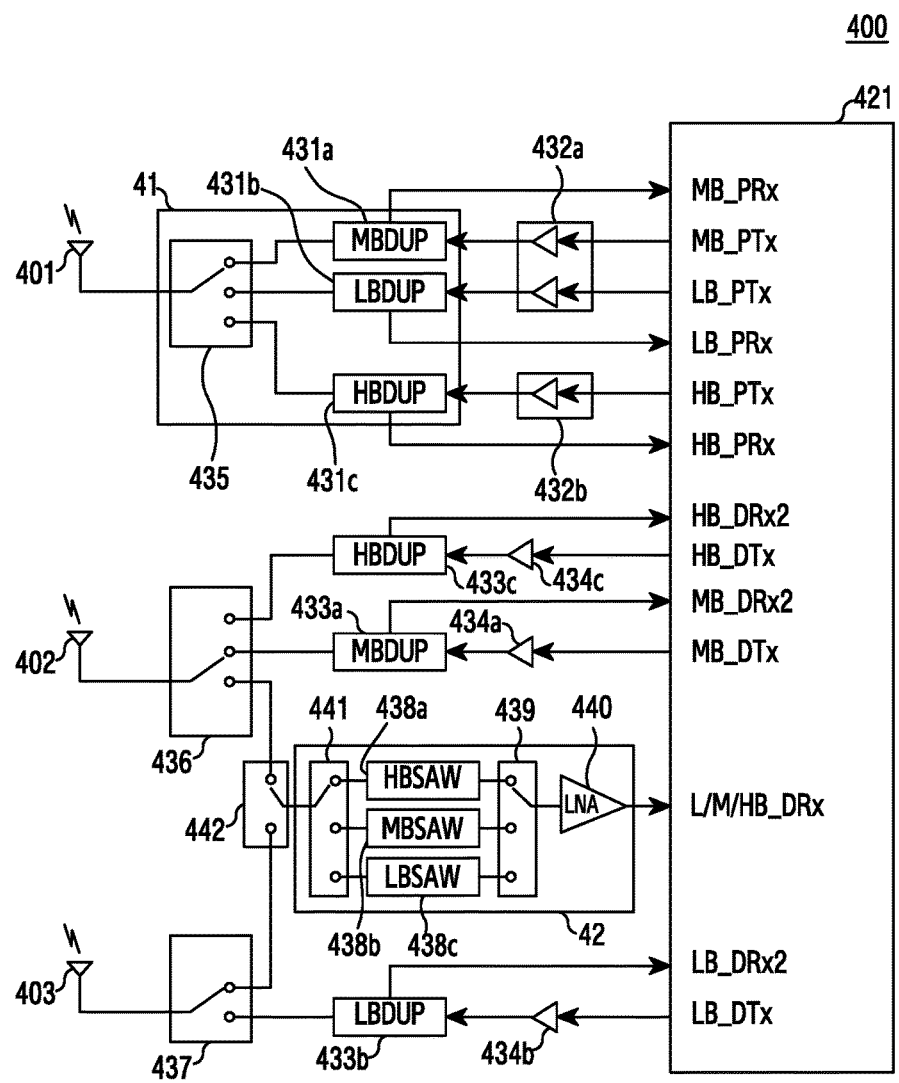
FIG. 4 is a block diagram illustrating the configuration of an electronic device that supports multiple bands according to an embodiment of the present disclosure.

The electronic device 300 may further include an application processor, a modem, a memory, a sensor module, and a location information reception module. FIG. 4 is a block diagram illustrating the configuration of an electronic device that supports multiple bands according to an embodiment of the present disclosure.

Referring to FIG. 4, an electronic device 400 according to an embodiment of the present disclosure may be similar to the electronic device 300 of FIG. 3.

In the electronic device 400 of FIG. 4, some of the elements separately implemented in FIG. 3 may be integrated into one module. For example, in the electronic device 400, a first switch 435, a first transmission/reception separator 431a, a second transmission/reception separator 431b, and a third transmission/reception separator 431c may be integrated into a Front-End Module In Duplexer (FEMID) 41. Further, in the electronic device 400, a fourth switch 441, a first filter 438a, a second filter 438b, a third filter 438c, a fifth switch 439, and a low-noise amplifier 440 may be integrated into a diversity LNA module 42.

Meanwhile, the diversity LNA module 42 of FIG. 4 may be designed such that one low-noise amplifier 440 low-noise amplifies second reception signals in the high band, the middle band, and the low band. For example, a sixth switch 442 may perform switching such that a second antenna 402 or a third antenna 403 is connected to the fourth switch 441. The fourth switch 441 may perform switching such that a sixth switch 442 is connected to one side of the first filter 438a, the second filter 438b, or the third filter 438c, and the fifth switch 439 may perform switching such that the low-noise amplifier 440 is connected to the other side of the first filter 438a, the second filter 438b, or the third filter 438c.

As one low-noise amplifier 440 is used, the low-band second reception signal terminal (LB_DRX1) and the high/middle-band second reception signal terminal (H/MB_DRX1) of FIG. 3 are integrated into one second reception signal terminal (L/M/HB_DRX).

Meanwhile, although FIG. 4 illustrates that the diversity LNA module 42 includes only one low-noise amplifier 440, the present disclosure is not limited thereto. For example, the diversity LNA module 42 may include a plurality of low-noise amplifiers.

The FDMID 41 and the diversity LNA module 42 according to an embodiment of the present disclosure are not limited to the form illustrated in FIG. 4. For example, elements included in the FEMID 41 and the diversity LNA module 42 may be variously changed.

Other elements (for example, a first antenna 401, a wireless-signal-processing module 421, a power amplification module 432a, a third power amplifier 432b, a fourth power amplifier 434a, a fifth power amplifier 434b, a sixth power amplifier 434c, a fourth transmission/reception separator 433a, a fifth transmission/reception separator 433b, a sixth transmission/reception separator 433c, a second switch 436, and a third switch 437) illustrated in FIG. 4 are similar to those illustrated in FIG. 3. A detailed description thereof will be omitted.

According to various embodiments, an electronic device comprises: a housing; a first antenna forming a first part of the housing or located within the housing adjacent to the first part of the housing; a second antenna forming a second part of the housing or located within the housing adjacent to the second part of the housing; and at least one processor including a first transmission terminal and a second transmission terminal connected to the first antenna and the second antenna, respectively, wherein the at least one processor identifies a strength of at least one of a transmission signal and a reception signal when transmission of a wireless signal is requested, and controls at least one of a phase and a strength of wireless signals output through the first transmission terminal and the second transmission terminal according to a result of the identification.

According to various embodiments, wherein the at least one processor performs control to transmit the wireless signal through one of the first antenna and the second antenna and not transmit the wireless signal through a remaining one thereof when a strength of the transmission signal is smaller than a preset first threshold value and a strength of the reception signal is larger than a preset second threshold value, and performs control to transmit a first transmission signal through the first antenna and transmit a second transmission signal, which is identical to the first transmission signal but has at least one of a different phase and a different strength, through the second antenna when the strength of the transmission signal is larger than or equal to the first threshold value or when the strength of the reception signal is equal to or smaller than the second threshold value.

According to various embodiments, wherein the at least one processor outputs the first transmission signal and the second transmission signal through the first transmission signal terminal and the second transmission signal terminal, respectively.

According to various embodiments, wherein the at least one processor includes a phase shifter for shifting the phase of the first transmission signal and generating the second transmission signal.

According to various embodiments, wherein the electronic device further comprises a third antenna, wherein, when multiple bands are supported, the at least one processor transmits a first transmission signal in a first band through the first antenna and transmits a second transmission signal in the first band through the second antenna or the third antenna.

According to various embodiments, the at least one processor may include a plurality of reception terminals for receiving a plurality of reception signals from the plurality of antennas.

According to various embodiments, wherein the electronic device further comprises a memory for storing a phase information database to which phase information for each antenna for adjusting at least one of a phase and a strength of at least some of the plurality of transmission signals is mapped.

According to various embodiments, wherein the at least one processor identifies a radiation direction of the electronic device, identifies whether the identified radiation direction of the electronic device faces a base station, and, when the radiation direction does not face the base station, adjusts at least one of the phase and the strength of at least some of the plurality of transmission signals to make the radiation direction face a direction of the base station.

According to various embodiments, wherein the electronic device further comprises a sensor module including a plurality of sensors for identifying a position of the electronic device, wherein the at least one processor extracts the radiation direction of the electronic device in a pre-stored default state and identifies a current radiation direction of the electronic device based on the extracted radiation direction and the identified position of the electronic device.

According to various embodiments, wherein the electronic device further comprises a location information reception module for receiving information on a current location of the electronic device, wherein the at least one processor receives location information of the base station and calculates a direction of the base station with respect to the electronic device based on information on the received current location of the electronic device and the received location information of the base station.

Figure 5:
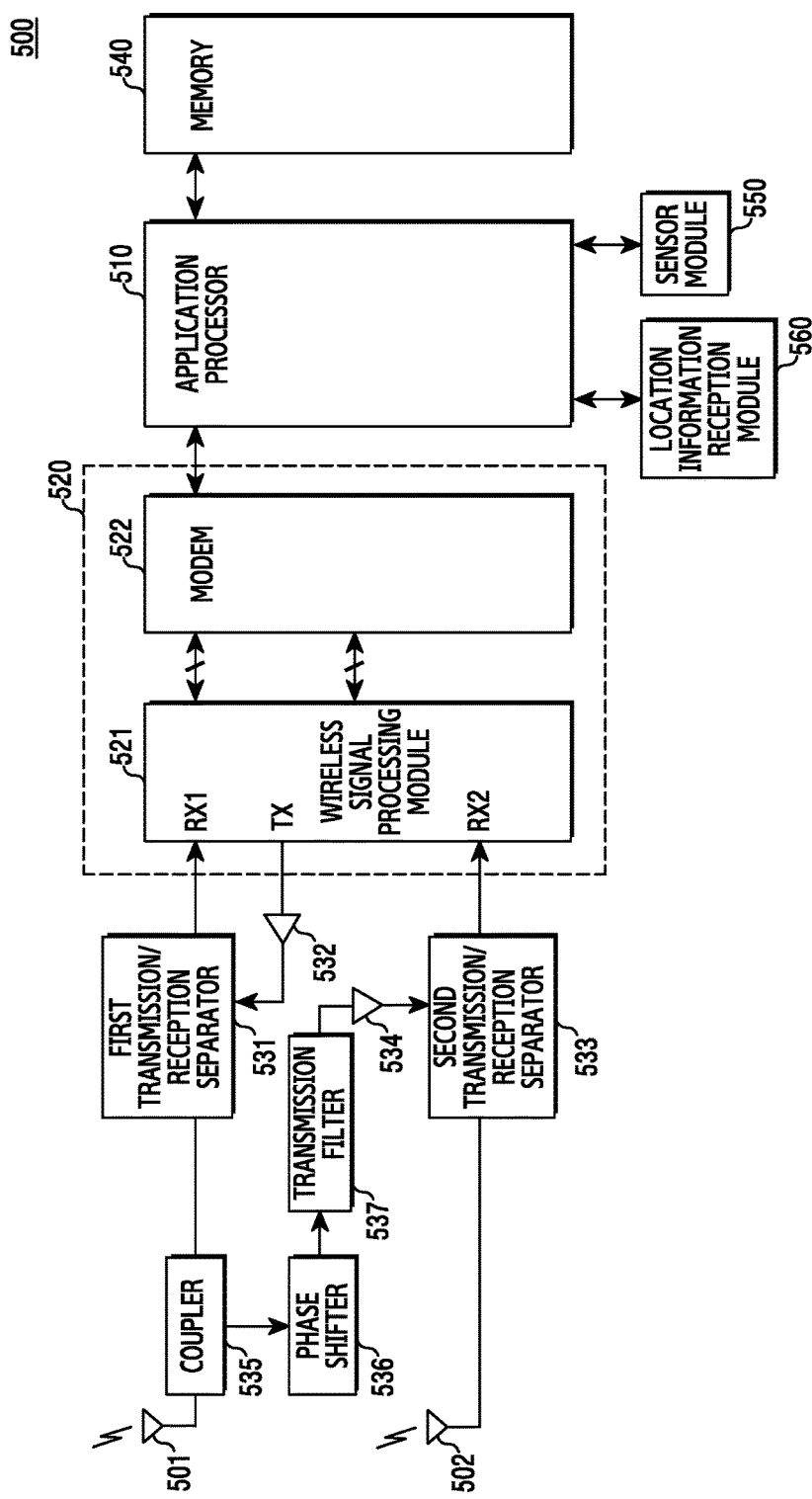
FIG. 5 is a block diagram illustrating the configuration of an electronic device that supports transmission diversity through a single transmission terminal according to an embodiment of the present disclosure.

FIG. 5 is a block diagram illustrating the configuration of an electronic device that supports transmission diversity through a single transmission terminal according to an embodiment of the present disclosure. As noted above, electronic device 500 can cause the radiation direction to be the same as the BS direction by transmitting a second transmission signal that is the same as the first transmission signal, except for a different phase delay and signal strength. In certain embodiments, the communication processor 520 can have one transmission terminal TX that transmits the first transmission signal to a first antenna 501. The signal that is transmitted the first antenna 501 can also be transmitted to a phase shifter 536 and a second amplifier 534, thereby resulting in the second transmission signal.

Referring to FIG. 5, an electronic device 500 according to an embodiment of the present disclosure may include an application processor 510, a communication processor 520, a memory 540, a first transmission/reception separator 531, a first power amplifier 532, a second transmission/reception separator 533, a second power amplifier 534, a coupler 535, a phase shifter 536, a transmission filter 537, a sensor module 550, and a location information reception module 560.

A wireless-signal-processing module 521 of the electronic device 500 according to an embodiment of the present disclosure may include only one transmission terminal (TX), unlike the wireless-signal-processing modules 121, 321, and 421 of the electronic devices 100, 300, and 400 of FIGS. 1, 3, and 4. The electronic device 500 may support transmission diversity through a single transmission terminal (TX). For example, the electronic device 500 may transmit a transmission signal (a first transmission signal) to the first power amplifier 532 through the transmission terminal (TX) when a transmission request is made. The amplified first transmission signal may be output (transmitted) to the outside through the first antenna 501 via the first transmission/reception separator 531 and the coupler 535. Meanwhile, a reflected signal of the first transmission signal may be input into the phase shifter 536 through a reverse port of the coupler 535. The phase shifter 536 may shift a phase of the input reflected signal of the first transmission signal. The transmission signal (a second transmission signal) having the shifted phase may be transmitted to the second power amplifier 534 via the transmission filter 537, and the second transmission signal amplified by the second power amplifier 534 may be output (transmitted) through the second antenna 502 via the second transmission/reception separator 533. As described above, the electronic device 500 according to an embodiment of the present disclosure may provide transmission diversity through a single transmission terminal (TX).

When it is not required to provide the transmission diversity, for example, when the strength of the reception signal is larger than a threshold value, the electronic device 500 may turn off the second power amplifier 534 and transmit a wireless signal through a single antenna (for example, the first antenna 501). When it is required to provide transmission diversity, for example, when the strength of the reception signal is equal to or smaller than the threshold value, the electronic device 500 may turn on the second power amplifier 534 and transmit a wireless signal through a plurality of antennas (for example, the first antenna 501 and the second antenna 502). According to some embodiments, the electronic device 500 may further include a switch between the coupler 535 and the phase shifter 536, and may turn off the switch when the strength of the reception signal is larger than the threshold value, and turn on the switch to provide transmission diversity when the strength of the reception signal is equal to or smaller than the threshold value.

Meanwhile between the coupler 535 and the phase shifter 536, a delay controller for compensating for a difference in a transmission time of a first transmission signal and a second transmission signal due to a difference between a path between the coupler 535 and the first antenna 501 and a path between the coupler 535 and the second antenna 502 may be further included. Alternatively, according to some embodiments, the phase shifter 536 may be replaced with the delay controller.

According to some embodiments, since the path from the coupler 535 to the second antenna 502 is not long, the transmission filter 537 and the second power amplifier 534 may be omitted when noise inflow and signal attenuation are low.

According to some embodiments, some of the elements illustrated in FIG. 5 may be integrated into a single module. For example, the first power amplifier 532 and the second power amplifier 534 may be integrated into a single power amplification module.

In certain embodiments, the memory 540 can store a table having a plurality of angles. The angles can be associated with phase and signal values for both the first transmission signal and the second transmission signal. When the first transmission signal has the first strength and first phase value, and the second transmission signal has the second strength and second phase value, the main lobe will form the angle associated with strength and phase values with a particular direction of the electronic device, such as the direction of the rear surface. The phase shifter 536 can receive the phase value for the second transmission signal, while the second amplifier 534 can amplify the signal based on the second strength value. FIG. 5 illustrates that the electronic device 500 supports transmission diversity through second antennas 501 and 502. However, embodiments of the present disclosure are not limited thereto. For example, the electronic device 500 may support transmission diversity through three antennas, as illustrated in FIGS. 3 and 4, or through four or more antennas.

Other elements (for example, a modem 522, the application processor 510, the memory 540, the sensor module 550, and the location information reception module 560) illustrated in FIG. 5 are similar to those illustrated in FIGS. 1 to 4. A detailed description thereof will be omitted.

Figure 6:
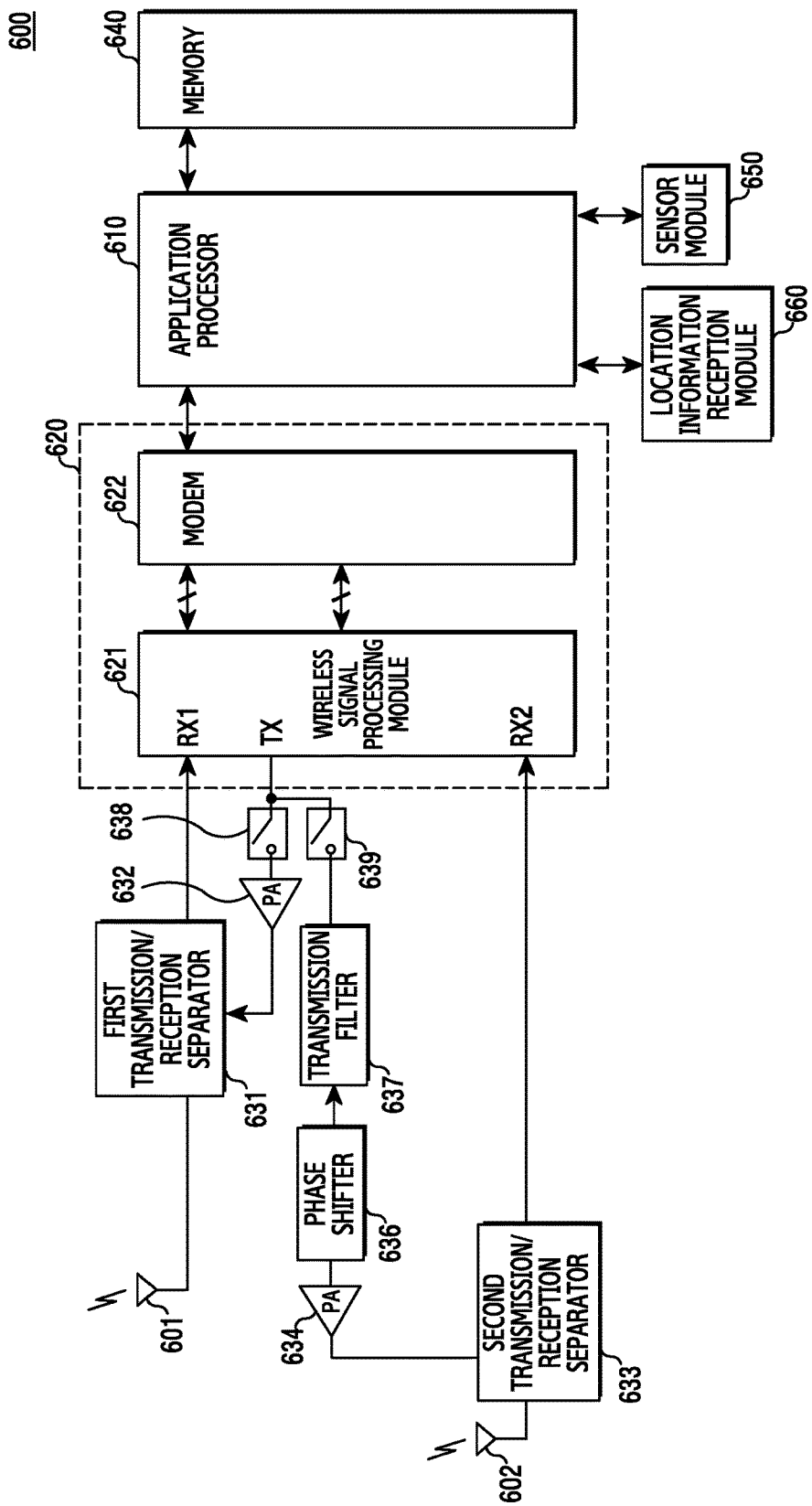
FIG. 6 is a block diagram illustrating the configuration of an electronic device that supports transmission diversity through a single transmission terminal according to an embodiment of the present disclosure.

FIG. 6 is a block diagram illustrating the configuration of an electronic device that supports transmission diversity through a single transmission terminal according to an embodiment of the present disclosure. The electronic device 600 includes a single transmission terminal TX that outputs a transmission signal to power amplifier 632 and first transmission separator 631, and to phase shifter 636 and second power amplifier 634. The output of the second amplifier 634 (the second transmission signal) is the same as the output of the first amplifier 632 (the first transmission signal), except for phase and strength differences.

Referring to FIG. 6, an electronic device 600 according to an embodiment of the present disclosure may include an application processor 610, a communication processor 620, a memory 640, a first transmission/reception separator 631, a first power amplifier 632, a second transmission/reception separator 633, a second power amplifier 634, a phase shifter 636, a transmission filter 637, a first switch 638, a second switch 639, a sensor module 650, and a location information reception module 660.

A wireless-signal-processing module 621 of the electronic device 600 according to an embodiment of the present disclosure may include one transmission terminal (TX), like the wireless-signal-processing module 521 of the electronic device 500 of FIG. 5.

The electronic device 600 according to an embodiment of the present disclosure may provide transmission diversity through a single transmission terminal (TX). For example, the electronic device 600 may transmit a first transmission signal to the first switch 638 and the second switch 639 through the transmission terminal (TX) when a transmission request is made.

When the electronic device 600 (for example, a modem 622) transmits a transmission signal through a single antenna (for example, the first antenna 601), for example, when the strength of the reception signal is larger than a threshold value, the electronic device 600 may turn on the first switch 638 and turn off the second switch 639.

Meanwhile, when the electronic device 600 (for example, the modem 622) transmits a wireless signal through a plurality of antennas (for example, the first antenna 601 and the second antenna 602), the electronic device 600 may turn on the first switch 638 and the second switch 639 and simultaneously transmit the transmission signal to the first power amplifier 632 and the transmission filter 637. The transmission signal (for example, the first transmission signal) transmitted to the first power amplifier 632 may be output (transmitted) to the outside through the first antenna 601 via the first transmission/reception separator 631. Meanwhile, the transmission signal (the second transmission signal) transmitted to the transmission filter 637 may be input into the second power amplifier 634 after the phase thereof is shifted by the phase shifter 636. The second transmission signal amplified by the second power amplifier 634 may be output (transmitted) to the outside through the second antenna 602 via the second transmission/reception separator 633. As described above, the electronic device 600 according to an embodiment of the present disclosure may provide transmission diversity through a single transmission terminal (TX).

According to some embodiments, since the path from the second switch 639 to the phase shifter 636 is not long, the transmission filter 637 may be omitted when almost no noise flows in.

According to some embodiments, some of the elements illustrated in FIG. 6 may be integrated into one module. For example, the first switch 638 and the second switch 639 may be integrated into one switch module. In another example, the first power amplifier 632 and the second power amplifier 634 may be integrated into one power amplification module.

FIG. 6 illustrates that the electronic device 600 includes two antennas 601 and 602. However, embodiments of the present disclosure are not limited thereto. For example, the electronic device 600 may include three antennas, as illustrated in FIGS. 3 and 4, or may include four or more antennas.

Meanwhile, other elements (for example, the modem 622, the application processor 610, the memory 640, the sensor module 650, and the location information reception module 660) illustrated in FIG. 6 are similar to those illustrated in FIGS. 1 to 5.

According to embodiments of the present disclosure, an electronic device comprises: a housing; a first antenna forming a first part of the housing or located within the housing adjacent to the first part of the housing; a second antenna forming a second part of the housing or located within the housing adjacent to the second part of the housing; and at least one processor including a plurality of reception terminals for receiving wireless signals through the first antenna and the second antenna and one transmission terminal for outputting a wireless signal to be output through at least one of a plurality of antennas, wherein the at least one processor identifies a strength of at least one of a transmission signal and a reception signal when transmission of a wireless signal is requested, and performs control to transmit the transmission signal, which is output through the transmission terminal, through the first antenna via a first path or to transmit and output the transmission signal to the first antenna and the second antenna through the first path or a second path for changing at least one of a phase and a strength of the transmission signal.

According to various embodiments, wherein the at least one processor performs control to transmit the transmission signal through the first antenna and to not transmit the transmission signal through the second antenna when a strength of the transmission signal is smaller than a preset first threshold value and a strength of the reception signal is larger than a preset second threshold value, and performs control to transmit the transmission signal to the first antenna and the second antenna through the first path and the second path when the strength of the transmission signal is larger than or equal to the first threshold value or when the strength of the reception signal is equal to or smaller than the second threshold value.

According to various embodiments, wherein the first path includes a first power amplifier for amplifying a transmission signal output from the transmission terminal, a first transmission/reception separator for filtering the amplified transmission signal, and a coupler for transmitting the filtered transmission signal to the first antenna and acquiring a reflected signal of the transmission signal, and the second path includes the coupler, a phase shifter for shifting a phase of the reflected signal acquired from the coupler, a second power amplifier for amplifying the reflected signal having the shifted phase, and a second transmission/reception separator for filtering the amplified signal and transmitting the filtered signal to the second antenna.

According to various embodiments, wherein the first path includes a first switch for switching a transmission signal output from the transmission terminal, a first power amplifier connected to the first switch, and a first transmission/reception separator for filtering the transmission signal amplified by the first power amplifier and transmitting the filtered transmission signal to the first antenna, and the second path includes a second switch for switching the transmission signal output from the transmission terminal, a phase shifter for shifting a phase of the transmission signal received through the second switch, a second power amplifier for amplifying a reflected signal having the shifted phase, and a second transmission/reception separator for filtering the signal amplified by the second power amplifier and transmitting the filtered signal to the second antenna.

According to various embodiments, the electronic device further comprised: a sensor module including a plurality of sensors for identifying a position of the electronic device; and a location information reception module for receiving location information of the electronic device, wherein the at least one processor receives location information of the base station, calculates a base station direction of the base station with respect to the electronic device based on the received location information of the electronic device and the received location information of the base station, identifies a current radiation direction of the electronic device based on a radiation direction of the electronic device in a pre-stored default state and the identified position of the electronic device to identify whether the current radiation direction of the electronic device matches the calculated base station direction, and, when the current radiation direction of the electronic device does not match the calculated base station direction based on a result of the identification, controls the radiation direction of the electronic device by adjusting at least one of a phase and a strength of at least one of the first transmission signal and the second transmission signal.

According to embodiments of the present disclosure, an electronic device comprises: a housing defining a plane, the housing having a front surface and a rear surface; a Global Navigation Satellite System (GNSS) module disposed within the housing, the GNSS configured to determine a location of the electronic device; a magnetic sensor configured to determine a direction that the rear surface of the housing faces; a location information reception module for determining a direction from the location of the electronic device to an access point; memory storing a plurality of angles, and a corresponding plurality of phases strength levels; an application processor configured to retrieve one of the corresponding plurality of phases and strength levels based on an offset angle between the direction from the location of the electronic device toward the access point and the direction that the rear surface of the housing faces; and a communication processor configured to transmit a first transmission signal using a first antenna and a second transmission signal using a second antenna with the one of the corresponding plurality of phases and strength levels.

Figure 7A:
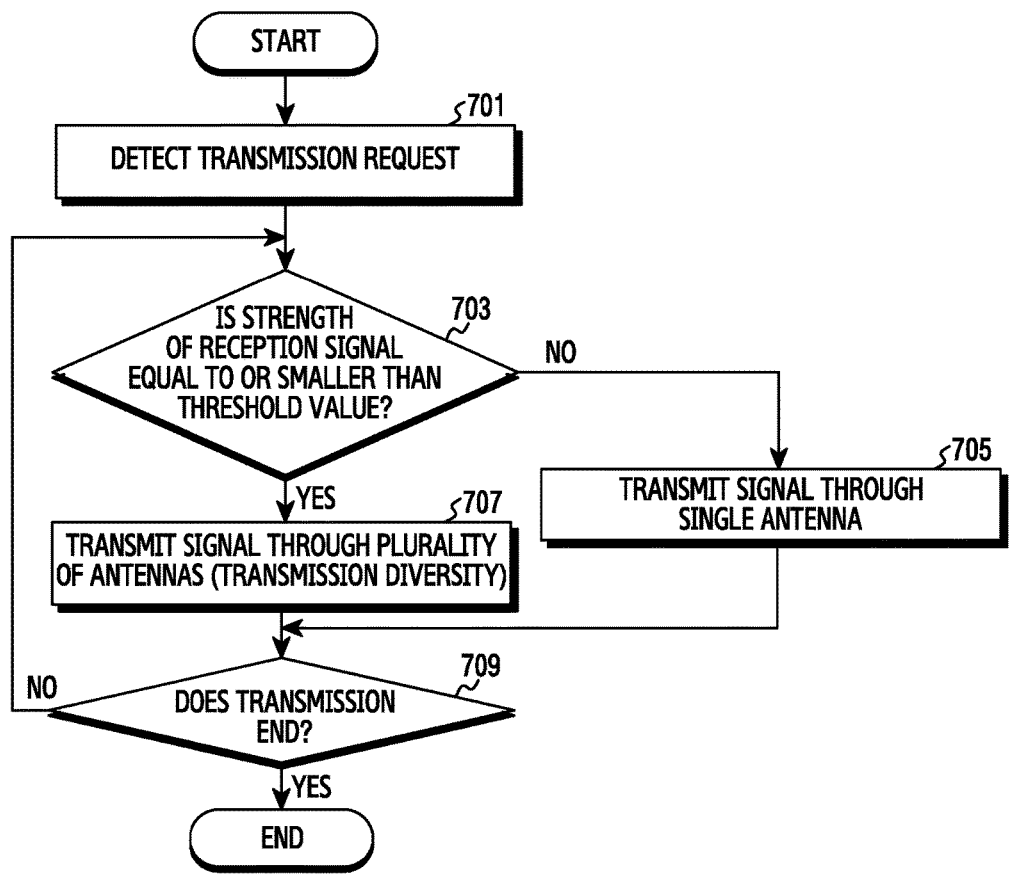
FIG. 7A is a flowchart illustrating a method of transmitting a wireless signal by an electronic device according to an embodiment of the present disclosure.

FIG. 7A is a flowchart illustrating a method of transmitting a signal by an electronic device according to an embodiment of the present disclosure.

Referring to FIG. 7A, according to various embodiments of the present disclosure, the electronic device (for example, the communication processor 120 of the electronic device 100, the communication processor 320 of the electronic device 300, the communication processor 420 of the electronic device 400, the communication processor 520 of the electronic device 500, or the communication processor 620 of the electronic device 600) may detect a transmission request in operation 701. For example, the electronic device may detect a voice call request, a video call request, or a request for updating multimedia data (pictures or videos).

In operation 703, the electronic device according to an embodiment of the present disclosure may identify whether the strength of the reception signal is equal to or smaller than a preset threshold value (for example, −90 dBm). For example, when a transmission request is made, the electronic device may measure the strength of the reception signal and identify whether the measured strength is equal to or smaller than a threshold value. Alternatively, the electronic device may measure the strength of the reception signal according to a predetermined period and identify whether the measured strength of the reception signal is equal to or smaller than the threshold value when a transmission request is detected before operation 701.

When the strength of the reception signal is determined not to be equal to or smaller than the threshold value based on a result of the identification in operation 703, the electronic device may proceed to operation 705. In operation 705, the electronic device according to an embodiment of the present disclosure may transmit a wireless signal through a single antenna. For example, the electronic device may transmit a signal through a preset main antenna (a first antenna) (for example, the first antenna 101, the first antenna 301, the first antenna 401, the first antenna 501, or the first antenna 601) among a plurality of antennas. At this time, the electronic device may receive a reception signal through the first antenna.

Meanwhile, when the strength of the reception signal is equal to or smaller than the threshold value based on the result of the identification in operation 703, the electronic device may proceed to operation 707. In operation 707, the electronic device according to an embodiment of the present disclosure may transmit a wireless signal through at least two of the plurality of antennas. For example, the electronic device may transmit a first transmission signal through a main antenna (for example, the first antenna), and may transmit a second transmission signal through a sub-antenna (for example, the second antenna) (for example, the second antenna 102, the second antenna 302, the second antenna 402, the second antenna 502, or the second antenna 602). At this time, the electronic device may receive a signal through both the first antenna and the second antenna.

Because the first transmission signal and the second transmission signal have different phases, it is possible to provide phase diversity. According to some embodiments, the electronic device may provide time diversity through different transmission times between the first transmission signal and the second transmission signal. To this end, as illustrated in FIGS. 1 to 4, the electronic device (for example, the wireless-signal-processing module 121 of FIG. 1, the wireless-signal-processing module 321 of FIG. 3, or the wireless-signal-processing module 421 of FIG. 4) may include a plurality of transmission terminals. Alternatively, as illustrated in FIGS. 5 and 6, the electronic device (for example, the wireless-signal-processing module 521 of FIG. 5 or the wireless-signal-processing module 621 of FIG. 6) may include one transmission terminal, and may further include a separate element for generating the second transmission signal based on the signal output from the one transmission terminal. For example, as illustrated in FIG. 5, the electronic device may acquire a reflected signal of the first transmission signal from a first antenna end through the coupler 535, phase-shift and amplify the acquired reflected signal, and transmit the signal through the second antenna as the second transmission signal. Alternatively, as illustrated in FIG. 6, the electronic device may simultaneously provide one transmission signal output from the wireless-signal-processing module 621 to two paths and transmit the transmission signal to each of the first antenna and the second antenna.

In operation 709, the electronic device according to an embodiment of the present disclosure may identify whether transmission has ended. When the transmission is determined not to have ended based on the result of the identification in operation 709, the electronic device may return to operation 703 and repeat the above-described operations. Meanwhile, when the transmission is determined to have ended based on the result of the identification in operation 709, the electronic device may end the procedure of controlling the transmission of the wireless signal.

As described above, the electronic device according to an embodiment of the present disclosure may support transmission diversity. Further, the electronic device may minimize battery consumption, because transmission diversity is provided only when the strength of a reception signal is weak. In addition, the electronic device according to an embodiment of the present disclosure may improve a specific absorption rate. For example, when a wireless signal is transmitted through a plurality of antennas, the electronic device according to an embodiment of the present disclosure may improve the specific absorption rate because transmission power is reduced in comparison to the case in which a wireless signal is transmitted through a single antenna. For example, when the electronic device uses one antenna, the electronic device may transmit a wireless signal with a strength of 23 dBm. When the electronic device uses two antennas, the electronic device may transmit a wireless signal with a strength of 20 dBm.

According to some embodiments, operations 703 and 705 may be omitted. For example, the electronic device according to an embodiment of the present disclosure may provide transmission diversity regardless of the strength of the reception signal. In this case, when a transmission request is made, elements (components, devices, or circuits) for transmitting the second transmission signal may operate constantly, and thus battery consumption may increase.

According to some embodiments, operations 703 and 705 may be omitted depending on the state of charge of the battery. For example, operations 703 and 705 are omitted when the remaining battery charge is sufficient (for example, higher than or equal to 50%), and operations 703 and 705 may be performed when the remaining battery charge is insufficient.

Figure 7B:
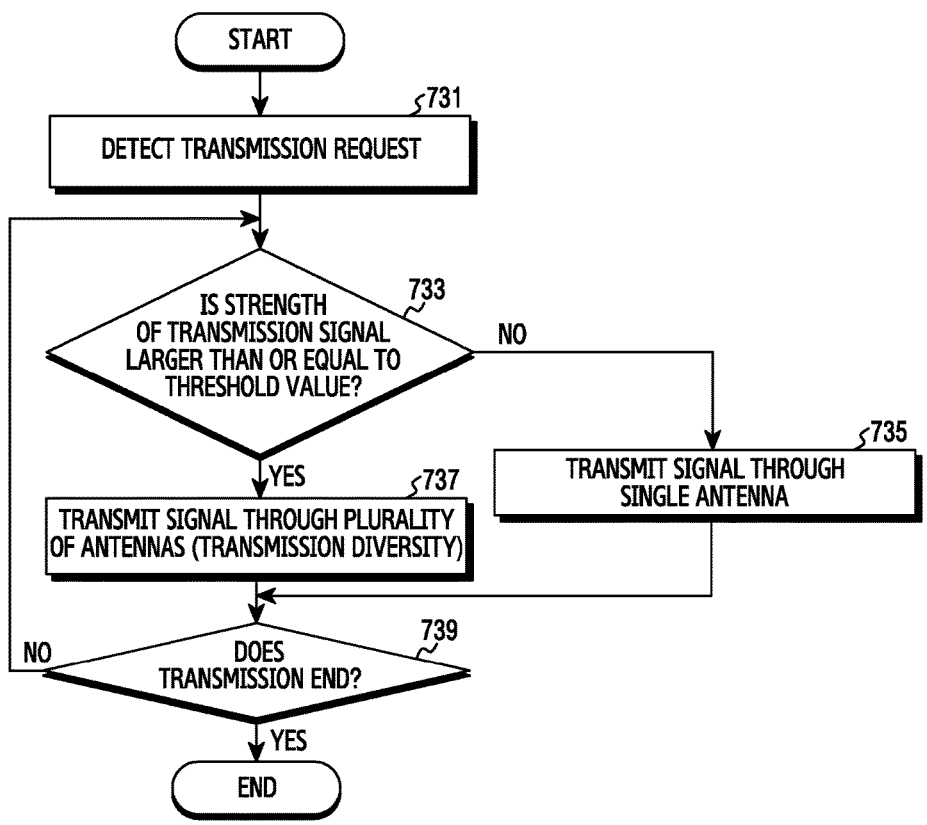
FIG. 7B is a flowchart illustrating a method of transmitting a wireless signal by an electronic device according to an embodiment of the present disclosure.

FIG. 7B is a flowchart illustrating a method of transmitting a signal by an electronic device according to an embodiment of the present disclosure.

Referring to FIG. 7B, according to various embodiments of the present disclosure, the electronic device (for example, the communication processor 120 of the electronic device 100, the communication processor 320 of the electronic device 300, the communication processor 420 of the electronic device 400, the communication processor 520 of the electronic device 500, or the communication processor 620 of the electronic device 600) may detect a transmission request in operation 731. For example, the electronic device may detect a voice call request, a video call request, or a request for updating multimedia data (pictures or videos).

In operation 733, the electronic device according to an embodiment of the present disclosure may identify whether the strength of the transmission signal is larger than or equal to a preset threshold value (for example, 20 dBm). For example, the electronic device may identify the strength of the transmission signal through Transmit Power Control (TPC).

When the strength of the transmission signal is not larger than or equal to the threshold value based on a result of the identification in operation 733, the electronic device may proceed to operation 735 and transmit a wireless signal through a signal antenna. For example, the electronic device may transmit a signal through a preset main antenna (for example, a first antenna) among a plurality of antennas.

Meanwhile, when the strength of the transmission signal is larger than or equal to the threshold value based on the result of the identification in operation 733, the electronic device may proceed to operation 737 and transmit a wireless signal through at least two of the plurality of antennas. For example, the electronic device may transmit the first transmission signal through a main antenna (for example, the first antenna) and transmit the second transmission signal through a sub-antenna (for example, the second antenna).

In operation 739, the electronic device according to an embodiment of the present disclosure may identify whether transmission has ended. When the transmission is determined not to have ended based on a result of the identification in operation 739, the electronic device may return to operation 733 and repeat the above-described operations. Meanwhile, when the transmission is determined to have ended based on the result of the identification in operation 739, the electronic device may end the procedure of controlling the transmission of the wireless signal.

According to an embodiment of the present disclosure described above, because a transmission scheme of the wireless signal is controlled based on the strength of the transmission signal, the transmission scheme may be rapidly determined even when a wireless signal is not being received or when reception of the signal is delayed.

Figure 7C:
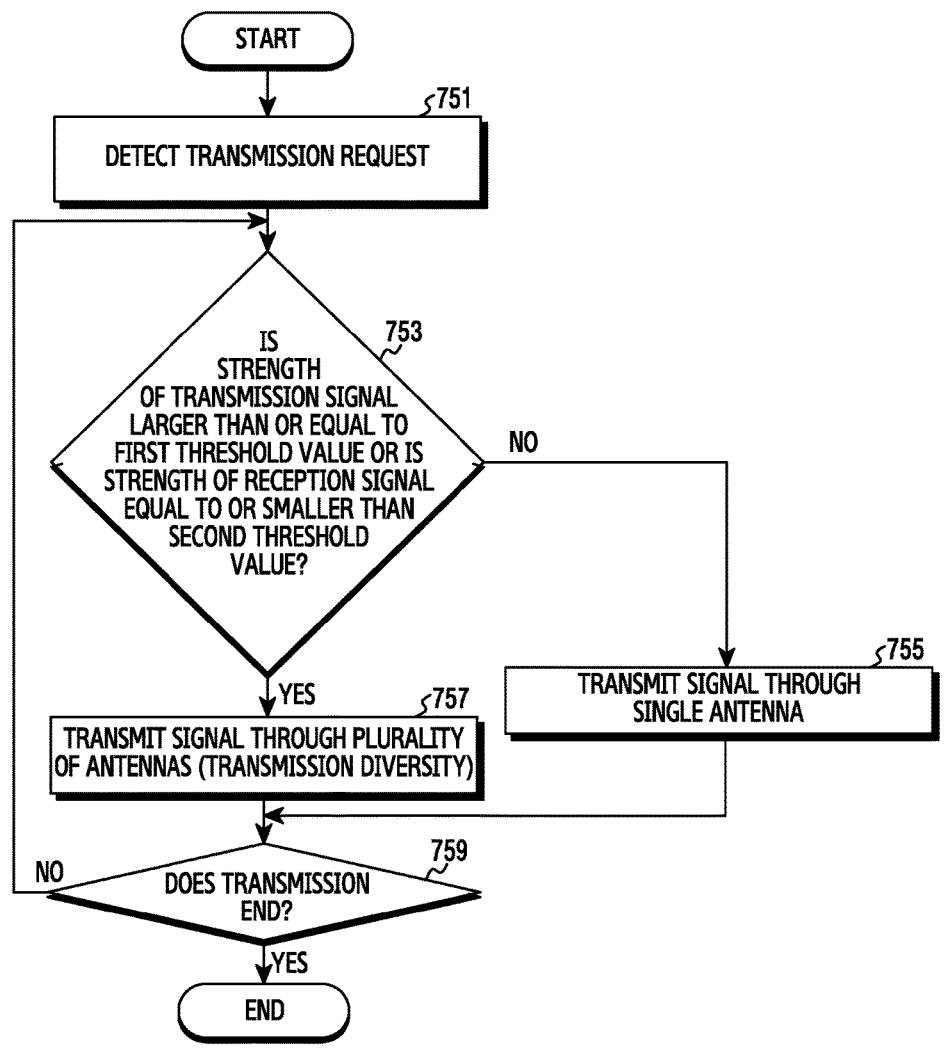
FIG. 7C is a flowchart illustrating a method of transmitting a wireless signal by an electronic device according to an embodiment of the present disclosure.

FIG. 7C is a flowchart illustrating a method of transmitting a signal by an electronic device according to an embodiment of the present disclosure.

Referring to FIG. 7C, according to various embodiments of the present disclosure, the electronic device (for example, the communication processor 120 of the electronic device 100, the communication processor 320 of the electronic device 300, the communication processor 420 of the electronic device 400, the communication processor 520 of the electronic device 500, or the communication processor 620 of the electronic device 600) may detect a transmission request in operation 751.

In operation 753, the electronic device according to an embodiment of the present disclosure may identify whether the strength of the transmission signal is larger than or equal to a preset first threshold value (for example, 20 dBm) or the strength of the reception signal is equal to or smaller than a preset second threshold value (for example, −90 dBm). When the strength of the transmission signal is determined not to be larger than or equal to the first threshold value and the strength of the reception signal is determined not to be equal to or smaller than the second threshold value based on the result of the identification in operation 753, the electronic device may proceed to operation 755 and transmit a wireless signal through a single antenna. For example, the electronic device may transmit a signal through a preset main antenna (for example, a first antenna) among a plurality of antennas.

Meanwhile, when the strength of the transmission signal is determined to be larger than or equal to the first threshold value and the strength of the reception signal is determined to be equal to or smaller than the second threshold value based on the result of identification in operation 753, the electronic device may proceed to operation 757 and transmit a wireless signal through at least two of the plurality of antennas. For example, the electronic device may transmit the first transmission signal through a main antenna (for example, the first antenna) and transmit the second transmission signal through a sub-antenna (for example, the second antenna).

In operation 759, the electronic device according to an embodiment of the present disclosure may identify whether transmission has ended. When the transmission is determined not to have ended based on a result of the identification in operation 759, the electronic device may return to operation 753 and repeat the above-described operations. Meanwhile, when the transmission is determined to have ended based on the result of the identification in operation 759, the electronic device may end the procedure of controlling the transmission of the wireless signal.

Figure 8:
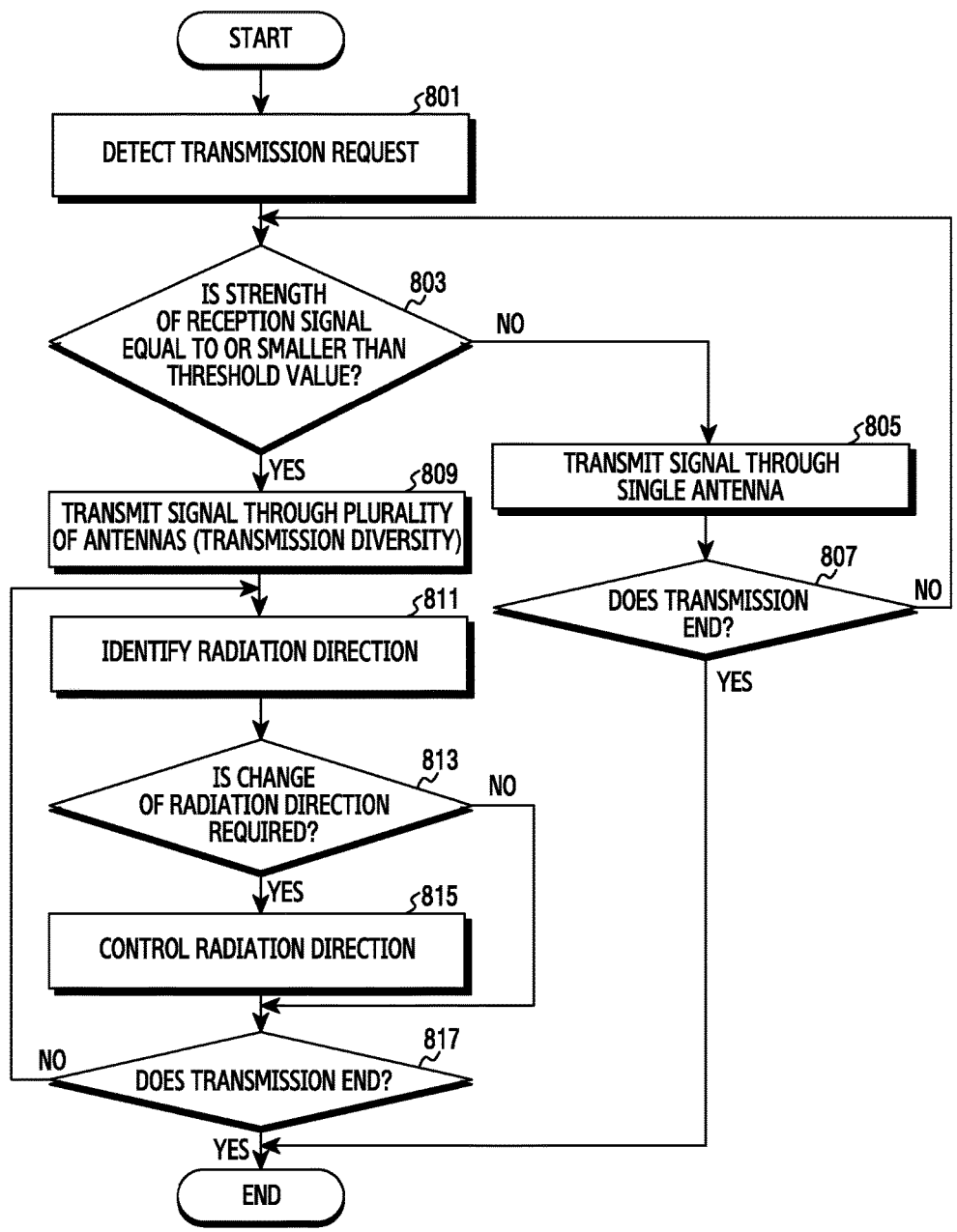
FIG. 8 is a flowchart illustrating a method of transmitting a wireless signal by an electronic device according to an embodiment of the present disclosure.

FIG. 8 is a flowchart illustrating a method of transmitting a signal by an electronic device according to an embodiment of the present disclosure.

Referring to FIG. 8, according to various embodiments of the present disclosure, the electronic device (for example, the communication processor 120 of the electronic device 100, the communication processor 320 of the electronic device 300, the communication processor 420 of the electronic device 400, the communication processor 520 of the electronic device 500, or the communication processor 620 of the electronic device 600) may detect a transmission request in operation 801.

In operation 803, the electronic device according to an embodiment of the present disclosure may identify whether the strength of the reception signal is equal to or smaller than a preset threshold value (for example, −90 dBm).

When the strength of the reception signal is determined not to be equal to or smaller than the threshold value based on the result of operation 803, the electronic device may proceed to operation 805. In operation 805, the electronic device according to an embodiment of the present disclosure may transmit a signal through a single antenna. For example, the electronic device may transmit a signal through a preset main antenna (for example, the first antenna) among a plurality of antennas. The electronic device may receive a signal through the first antenna.

In operation 807, the electronic device according to an embodiment of the present disclosure may identify whether transmission has ended. When the transmission is determined not to have ended based on a result of the identification in operation 807, the electronic device may return to operation 803 and repeat the above-described operations. When the transmission is determined to have ended based on the result of the identification in operation 807, the electronic device may end the procedure of controlling the transmission of the signal.

Meanwhile, when the strength of the reception signal is equal to or smaller than the threshold value based on the result of identification in operation 803, the electronic device may proceed to operation 809. In operation 809, the electronic device according to an embodiment of the present disclosure may transmit a signal through at least two of the plurality of antennas. A detailed description of the transmission procedure of the signal using the plurality of antennas will be omitted.

In operation 811, the electronic device according to an embodiment of the present disclosure may identify a radiation direction. For example, the electronic device may identify the radiation direction based on a main lobe direction and a current orientation of the electronic device. For example, the electronic device may identify the main lobe direction in the state in which the first signal and the second signal have a default phase. Further, the electronic device may identify the orientation through various sensors (an illumination sensor, a gyro sensor, an acceleration sensor, a geomagnetic sensor, or an atmospheric pressure sensor). For example, when the rear surface of the electronic device faces north in the state in which main lobe direction is perpendicular to the rear surface of the electronic device, the electronic device may recognize that the radiation direction is north.

In operation 813, the electronic device according to an embodiment of the present disclosure may identify whether a change of the radiation direction is required. For example, the electronic device may identify whether the radiation direction faces the BS. To this end, the electronic device may receive location information of the BS. Further, the electronic device may identify a location of the electronic device through a location information reception module (GPS or GNSS). For example, a line from the location of the electronic device toward the BS is the BS direction. According to some embodiments, the electronic device may identify the location of the electronic device based on information on an Access Point (AP) located near the electronic device. For example, the electronic device may consider the location information of the AP as location information of the electronic device. According to some embodiments, when the electronic device is connected to an AP installed in a particular place (for example, a home, office, theater, or department store), the electronic device may consider location information of the particular place as location information of the electronic device.

The electronic device may compare location information of the electronic device and location information of the BS, identify a relative direction (BS direction) of the BS, and identify whether the identified BS direction matches the radiation direction identified in operation 811.

According to some embodiments, the electronic device may change the radiation direction according to a preset rule, and, when the strength of the reception signal is larger than or equal to a preset threshold value (for example, −85 dBm), the electronic device may recognize that the radiation direction matches the BS direction. Alternatively, the electronic device may measure the strength of the reception signal in all directions (for example, 360 degrees) at predetermined intervals and select the direction for which the strength of the reception signal is the largest.

When the change of the radiation direction is required based on a result of the identification in operation 813, for example, when the radiation direction faces the BS, the electronic device may proceed to operation 815 and control the radiation direction. For example, the electronic device may control the radiation direction by properly adjusting phases and/or strengths (power) of the first transmission signal transmitted through the first antenna and the second transmission signal transmitted through the second antenna.

To this end, the electronic device may store a phase information DB (not shown) to which phase information for each antenna for adjusting the radiation direction is mapped. The phase information DB may be stored in the memory (for example, the memory 140 of FIG. 1, the memory 540 of FIG. 5, or the memory 640 of FIG. 6), or the memory (not shown) included in the communication processor (for example, the communication processor 120 of FIG. 1, the communication processor 320 of FIG. 3, the communication processor 420 of FIG. 4, the communication processor 520 of FIG. 5, or the communication processor 620 of FIG. 6). After adjusting the radiation direction, the electronic device may proceed to operation 817 described below.

In certain embodiments, the electronic device may determine the rear surface direction and an offset angle between the rear surface direction and the BS direction. The application processor 110, 510, 610 can use the offset angle to retrieve a first phase, second phase, first strength, and/or second strength from the memory 140, 540, 640 that correspond to the offset angle (or rounded offset angle, nearest angle to the offset angle, or interpolate between angles adjacent to the offset angle). The communication processor 120, 520, 620 uses the phase(s), and strength(s) to cause the radiation direction to match the BS direction. For example, in FIGS. 5 and 6, the second phase value can be provided to the phase shifter 536/636 and the second strength value can be provided to amplifier 534/634.

Meanwhile, when the change of the radiation direction is not required based on the result of identification in operation 813, the electronic device may proceed to operation 817.

In operation 817, the electronic device according to an embodiment of the present disclosure may identify whether transmission has ended. When the transmission is determined not to have ended based on the result of the identification in operation 817, the electronic device may return to operation 811 and repeat the above-described operations. When the transmission is determined to have ended based on the result of the identification in operation 817, the electronic device may end the procedure of controlling the transmission of the signal.

As described above, when the electronic device according to an embodiment of the present disclosure supports transmission diversity, the electronic device may control the radiation direction to be the BS direction by adjusting the phase and/or the strength of at least one of the first transmission signal and the second transmission signal. Accordingly, the electronic device according to an embodiment of the present disclosure may further improve transmission performance. In addition, the electronic device according to an embodiment of the present disclosure may improve a specific absorption rate.

According to some embodiments, the electronic device may control the transmission procedure depending on the strength of the transmission signal. For example, operation 803 may be replaced with an operation of identifying whether the strength of the transmission signal is larger (or equal to) than a preset threshold value (for example, 20 dBm). According to some embodiments, the electronic device may control the transmission procedure in consideration of the strength of the transmission signal and the strength of the reception signal. For example, operation 803 may be replaced with an operation of identifying whether the strength of the transmission signal is larger than (or equal to) a preset first threshold value (for example, 20 dBm) or the strength of the reception signal is equal or smaller than a second threshold value (for example, −90 dBm).

According to embodiments of the present disclosure, a method of transmitting a wireless signal by an electronic device comprising a first antenna and a second antenna comprises: identifying a strength of at least one of a transmission signal and a reception signal in response to a request to transmit a wireless signal; and controlling at least one of a phase and a strength of at least one transmission signal output from a communication processor based on a result of the identification.

According to various embodiments, wherein the controlling of at least one of the phase and the strength comprises: performing control to transmit the transmission signal through one of the first antenna and the second antenna and not transmit the wireless signal through a remaining one thereof when a strength of the transmission signal is smaller than a preset first threshold value and a strength of the reception signal is equal to or smaller than a preset second threshold value; and transmitting a first transmission signal and a second transmission signal, having at least one of a different phase and a different strength, through the first antenna and the second antenna when the strength of the transmission signal is larger than or equal to the first threshold value or the strength of the reception signal is equal to or smaller than the second threshold value.

According to various embodiments, wherein the controlling of at least one of the phase and the strength comprises outputting a first transmission signal and a second transmission signal, having a phase different from a phase of the first transmission signal, through a first transmission terminal and a second transmission terminal included in the communication processor, respectively, and transmitting the first transmission signal and the second transmission signal through the first antenna and the second antenna, respectively.

According to various embodiments, wherein the controlling of at least one of the phase and the strength comprises: transmitting a transmission signal output through one transmission terminal included in the communication processor through the first antenna as a first transmission signal; and acquiring a reflected signal of the first transmission signal from the first antenna, changing at least one of a phase and a size of the acquired reflected signal, and transmitting the reflected signal having at least one of the changed phase and size through the second antenna as a second transmission signal.

According to various embodiments, wherein the controlling of at least one of the phase and the strength comprises: outputting a transmission signal through one transmission terminal included in the communication processor; and performing switching such that the output transmission signal is transmitted, as a first transmission signal, through the first antenna via a first transmission path and such that at least one of a phase and a size of the output transmission signal is changed and the changed transmission signal is transmitted, as a second transmission signal, through the second antenna via a second transmission path.

According to various embodiments, the method further comprises: identifying a radiation direction of the electronic device; identifying whether the identified radiation direction faces a base station; and when the identified radiation direction does not face the base station, adjusting at least one of a phase and a size of at least one of the first transmission signal and the second transmission signal such that the radiation direction faces the base station.

According to various embodiments, wherein the identifying of the radiation direction of the electronic device comprises: extracting a radiation direction of the electronic device in a pre-stored default state; identifying a position of the electronic device through a plurality of sensors; and identifying a current radiation direction of the electronic device based on the extracted radiation direction and the identified position.

According to various embodiments, wherein the identifying of whether the identified radiation direction faces the base station comprises: identifying a current location of the electronic device; receiving a location of the base station; and calculating a direction of the base station with respect to the electronic device based on the acquired current location of the electronic device and the received location of the base station.

Figure 9:
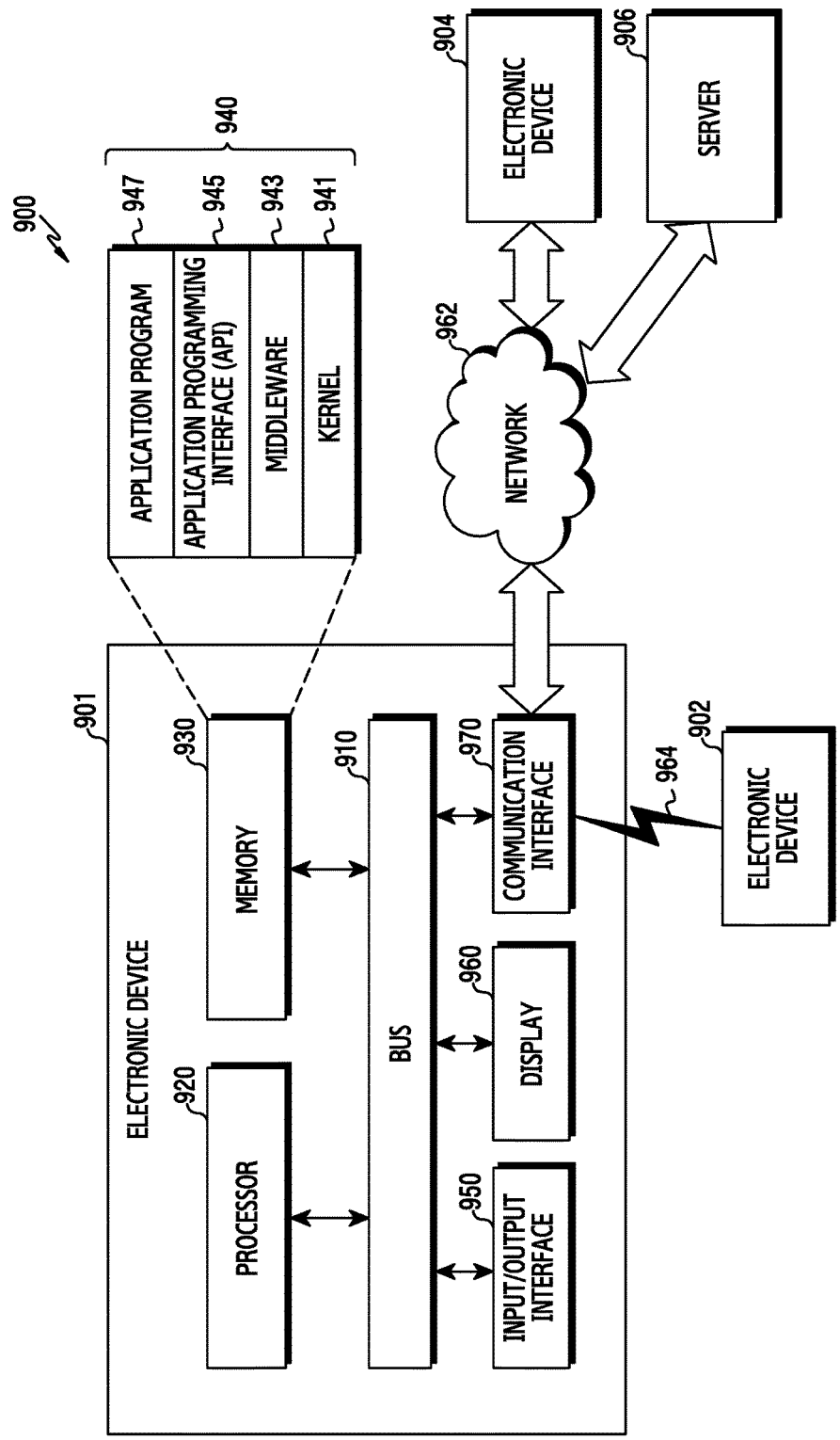
FIG. 9 illustrates a network environment including the electronic device according to various embodiments of the present disclosure.

FIG. 9 is a view showing a network environment including an electronic device according to various exemplary embodiments of the present disclosure.

Referring initially to FIG. 9, an electronic device 901 resides in a network environment 900. The electronic device 901 can include a bus 910, a processor 920, a memory 930, an input/output interface 950, a display 960, and a communication interface 970. The electronic device 901 may be provided without at least one of the components, or may include at least one additional component. The bus 910 can include a circuit for connecting the components 920 through 970 and delivering communication signals (e.g., control messages or data) therebetween. The processor 920 can include one or more of a CPU, an application processor, and a Communication Processor (CP). The processor 920, for example, can perform an operation or data processing with respect to control and/or communication of at least another component of the electronic device 901.

The memory 930 can include a volatile and/or nonvolatile memory. The memory 930, for example, can store commands or data relating to at least another component of the electronic device 901. According to an embodiment, the memory 930 can store software and/or a program 940. The program 940 can include, for example, a kernel 941, middleware 943, an Application Programming Interface (API) 945, and/or an application program (or "application") 947. At least part of the kernel 941, the middleware 943, or the API 945 can be referred to as an Operating System (OS). The kernel 941 can control or manage system resources (e.g., the bus 910, the processor 920, or the memory 930) used for performing operations or functions implemented by the other programs (e.g., the middleware 943, the API 945, or the application program 947). Additionally, the kernel 941 can provide an interface for controlling or managing system resources by accessing an individual component of the electronic device 901 from the middleware 943, the API 945, or the application program 947.

The middleware 943, for example, can serve an intermediary role for exchanging data between the API 945 or the application program 947 and the kernel 941 through communication. Additionally, the middleware 943 can process one or more job requests received from the application program 947, based on their priority. For example, the middleware 943 can assign a priority for using a system resource (e.g., the bus 910, the processor 920, or the memory 930) of the electronic device 901 to at least one of the application programs 947, and process the one or more job requests. The API 945, as an interface through which the application 947 controls a function provided from the kernel 941 or the middleware 943, can include, for example, at least one interface or function (e.g., an instruction) for file control, window control, image processing, or character control. The input/output interface 950, for example, can deliver commands or data inputted from a user or another external device to other component(s) of the electronic device 901, or output commands or data inputted from the other component(s) of the electronic device 901 to the user or another external device.

The display 960, for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 960, for example, can display various contents (e.g., texts, images, videos, icons, and/or symbols) to the user. The display 960 can include a touch screen, for example, and receive touch, gesture, proximity, or hovering inputs by using an electronic pen or a user's body part. The communication interface 970, for example, can set a communication between the electronic device 901 and an external device (e.g., a first external electronic device 902, a second external electronic device 904, or a server 906). For example, the communication interface 970 can communicate with the external device (e.g., the second external electronic device 904 or the server 906) over a network 962 through wireless communication or wired communication.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, as shown by an element 964 of FIG. 9, at least one of Wireless Fidelity (WiFi), LiFi (light fidelity), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 962 can include a telecommunications network, for example, at least one of computer network (e.g., LAN or WAN), Internet, and telephone network.

Each of the first and second external electronic devices 902 and 904 can be of the same as or of a different type from that of the electronic device 901. According to embodiments of the present disclosure, all or part of operations executed in the electronic device 901 can be executed by another electronic device or a plurality of electronic devices (e.g., the electronic device 902 or 904, or the server 906). To perform a function or service automatically or by request, instead of performing the function or the service by the electronic device 901, the electronic device 901 can request at least part of a function relating thereto from another device (e.g., the electronic device 902 or 904, or the server 906). The other electronic device (e.g., the electronic device 902 or 904, or the server 906) can perform the requested function or an additional function and send its result to the electronic device 901. The electronic device 901 can provide the requested function or service by processing the received result. In doing so, for example, cloud computing, distributed computing, or client-server computing techniques can be used.

The electronic device 901 can be disposed in a planar housing, generally having front and rear surfaces separated by a thin depth. The display 960 is disposed on the front surface.

Figure 10:
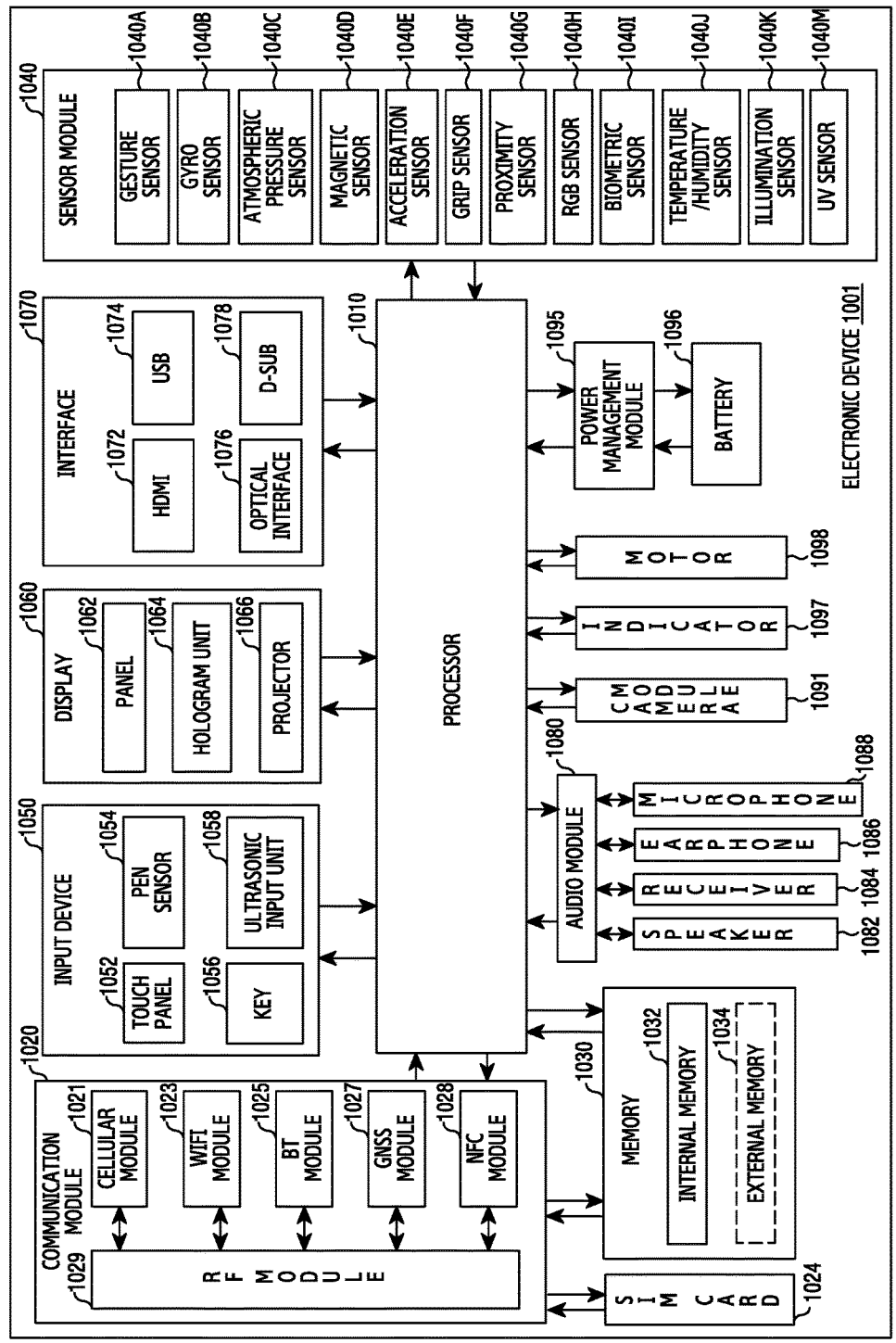
FIG. 10 is a block diagram illustrating the electronic device according to various embodiments.

FIG. 10 is a block diagram of an electronic device 1001 according to an embodiment of the present disclosure. The electronic device 1001, for example, can include all or part of the above-described electronic device 901 of FIG. 9. The electronic device 1001 includes one or more processors (e.g., an AP) 1010, a communication module 1020, a Subscriber Identification Module (SIM) 1024, a memory 1030, a sensor module 1040, an input device 1050, a display 1060, an interface 1070, an audio module 1080, a camera module 1091, a power management module 1095, a battery 1096, an indicator 1097, and a motor 1098. The processor 1010, for example, can control a plurality of hardware or software components connected to the processor 1010, and also can perform various data processing and operations by executing an OS or an application program. The processor 1010 can be implemented with a System on Chip (SoC), for example. The processor 1010 can further include a Graphic Processing Unit (GPU) and/or an image signal processor. The processor 1010 may include at least part (e.g., a cellular module 1021) of the components shown in FIG. 10. The processor 1010 can load commands or data received from at least one other component (e.g., a nonvolatile memory) into a volatile memory, process them, and store various data in the nonvolatile memory.

The communication module 1020 can have the same or similar configuration to the communication interface 970 of FIG. 9. The communication module 1020 can include, for example, the cellular module 1021, a WiFi module 1023, a Bluetooth (BT) module 1025, a GNSS module 1027, an NFC module 1028, and an RF module 1029. The cellular module 1021, for example, can provide voice call, video call, Short Message Service (SMS), or Internet service through a communication network. The cellular module 1021 can identify and authenticate the electronic device 1001 in a communication network by using the SIM (e.g., a SIM card) 1024. The cellular module 1021 can perform at least part of a function that the processor 1010 provides. The cellular module 1021 can further include a CP. At least some (e.g., two or more) of the cellular module 1021, the WiFi module 1023, the BT module 1025, the GNSS module 1027, and the NFC module 1028 can be included in one Integrated Circuit (IC) or an IC package. The RF module 1029, for example, can transmit/receive a communication signal (e.g., an RF signal). The RF module 1029, for example, can include a transceiver, a Power Amp Module (PAM), a frequency filter, a Low Noise Amplifier (LNA), or an antenna. According to another embodiment, at least one of the cellular module 1021, the WiFi module 1023, the BT module 1025, the GNSS module 1027, and the NFC module 1028 can transmit/receive an RF signal through an additional RF module. The SIM 1024, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 1030 (e.g., the memory 930) can include at least one of an internal memory 1032 and an external memory 1034. The internal memory 1032 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 1034 can include flash drive, for example, Compact Flash (CF), Secure Digital (SD), micro SD, mini SD, extreme digital (xD), Multi-Media Card (MMC), or memory stick. The external memory 1034 can be functionally or physically connected to the electronic device 1001 through various interfaces.

The sensor module 1040 can, for example, measure physical quantities or detect an operating state of the electronic device 1001, and thus convert the measured or detected information into electrical signals. The sensor module 1040 can include at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (e.g., a Red, Green, Blue (RGB) sensor), a bio sensor 1040I, a temperature/humidity sensor 1040J, an illumination sensor 1040K, and an Ultra Violet (UV) sensor 1040M. Additionally or alternately, the sensor module 1040 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 1040 can further include a control circuit for controlling at least one sensor therein. The electronic device, as part of the processor 1010 or individually, can further include a processor configured to control the sensor module 1040 and thus control the sensor module 1040 while the processor 1010 is sleeping.

The input device 1050 can include at least one of a touch panel 1052, a (digital) pen sensor 1054, a key 1056, and an ultrasonic input device 1058. The touch panel 1052 can use at least one of, for example, capacitive, resistive, infrared, and ultrasonic methods. Additionally, the touch panel 1052 can further include a control circuit. The touch panel 1052 can further include a tactile layer to provide a tactile response to a user. The (digital) pen sensor 1054 can include, for example, part of a touch panel or a sheet for recognition. The key 1056 can include, for example, a physical button, a touch key, an optical key, or a keypad. The ultrasonic input device 1058 can detect ultrasonic waves from an input means through a microphone 1088 and check data corresponding to the detected ultrasonic waves.

The display 1060 (e.g., the display 960) can include at least one of a panel 1062, a hologram device 1064, a projector 1066, and/or a control circuit for controlling them. The panel 1062 can be implemented to be flexible, transparent, or wearable, for example. The panel 1062 and the touch panel 1052 can be configured with one or more modules. The panel 1062 can include a pressure sensor (or a force sensor) for measuring a pressure of the user touch. The pressure sensor can be integrated with the touch panel 1052, or include one or more sensors separately from the touch panel 1052. The hologram device 1064 can show three-dimensional images in the air by using the interference of light. The projector 1066 can display an image by projecting light on a screen. The screen, for example, can be placed inside or outside the electronic device 1001. The interface 1070 can include, for example, an HDMI 1072, a USB 1074, an optical interface 1076, or a D-subminiature (D-sub) 1078. The interface 1070 can be included in, for example, the communication interface 970 of FIG. 9. Additionally or alternately, the interface 1070 can include a Mobile High-Definition Link (MHL) interface, a SD card/MMC interface, or an Infrared Data Association (IrDA) standard interface.

The audio module 1080, for example, can convert sounds into electrical signals and convert electrical signals into sounds. At least some components of the audio module 1080 can be included in, for example, the input/output interface 950 of FIG. 9. The audio module 1080 can process sound information inputted or outputted through a speaker 1082, a receiver 1084, an earphone 1086, or the microphone 1088. The camera module 1091, as a device for capturing still images and videos, can include one or more image sensors (e.g., a front sensor or a rear sensor), a lens, an Image Signal Processor (ISP), or a flash (e.g., an LED or a xenon lamp). The power management module 1095, for example, can manage the power of the electronic device 1001. According to an embodiment of the present disclosure, the power management module 1095 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. A battery gauge can measure the remaining capacity of the battery 1096, or a voltage, current, or temperature of the battery 1096 during charging. The battery 1096 can include, for example, a rechargeable battery and/or a solar battery.

The indicator 1097 can display a specific state of the electronic device 1001 or part thereof (e.g., the processor 1010), for example, a booting state, a message state, or a charging state. The motor 1098 can convert electrical signals into mechanical vibration and generate a vibration or haptic effect. The electronic device 1001 can include a mobile TV supporting device (e.g., a GPU) for processing media data according to standards such as Digital Multimedia Broadcasting (DMB), Digital Video Broadcasting (DVB), or MediaFLOW™. Each of the above-described components of the electronic device can be configured with at least one component and the name of a corresponding component can vary according to the kind of an electronic device. According to an embodiment of the present disclosure, an electronic device (e.g., the electronic device 1001) can be configured to include at least one of the above-described components or an additional component, or to not include some of the above-described components. Additionally, some of components in an electronic device are configured as one entity, so that functions of previous corresponding components are performed identically.

The electronic device 1001 can be disposed in a planar housing, generally having front and rear surfaces separated by a thin depth. The display 1060 is disposed on the front surface.

In certain embodiments, the GNSS module 1027 can be used to determine the location of the electronic device 1001. The processor 1010 can determine the location of an Access Point. The direction from the location of the electronic device 1001 and the Access Point can be considered the BS direction.

The magnetic sensor 1040D can be used to determine the rear surface direction of the electronic device 1001.

The memory 1030 can store a table including a plurality of angles and a corresponding plurality of phases and signal strengths. The plurality of phases and signal strengths correspond to the angles, such that when the first and second transmission signal have the signal strengths, and the second transmission signal is delayed from the first transmission signal by the phase, the radiation direction forms the angle with respect to the rear surface direction.

Accordingly, the processor 1010 can use the offset angle to retrieve phases and signal strengths from the memory 1030. The communication module uses the retrieved phases and signal strengths for the first and second transmission signals.

Figure 11:
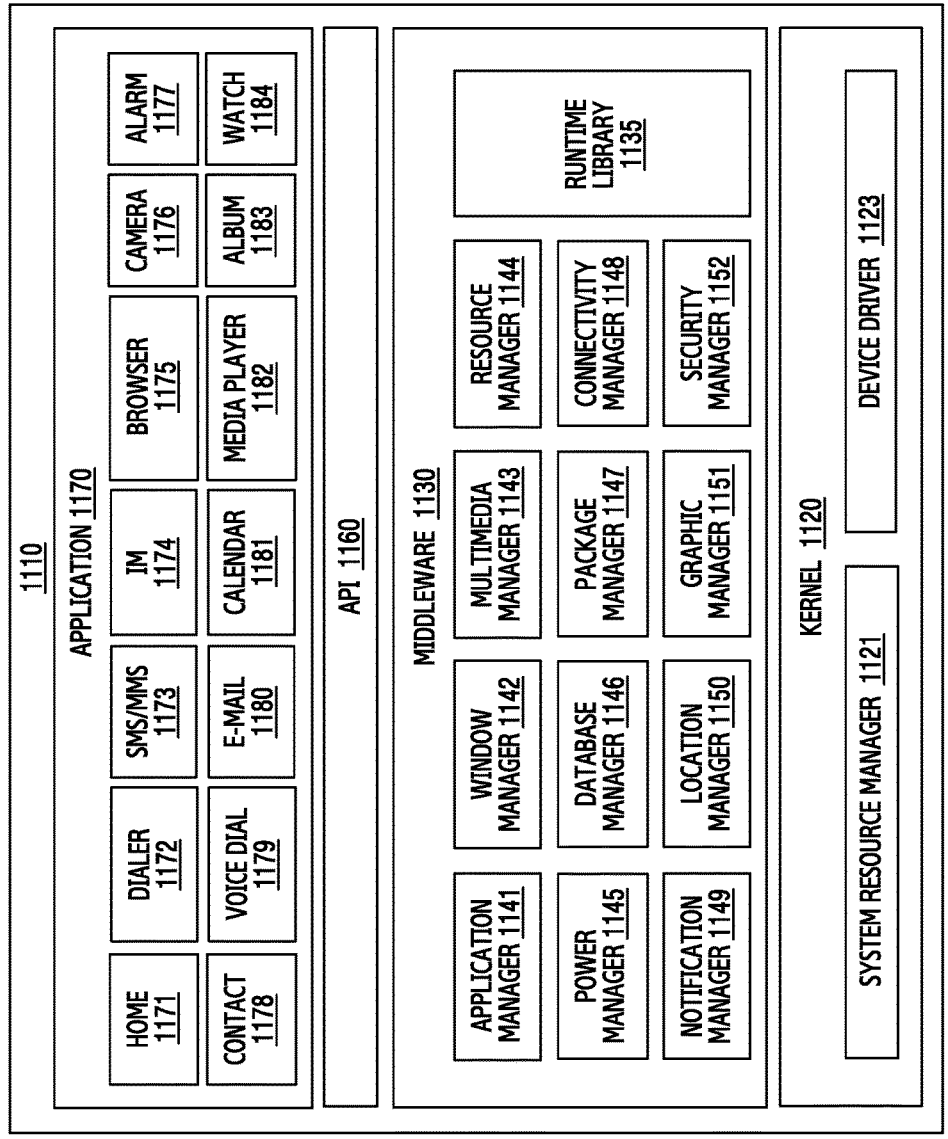
FIG. 11 is a block diagram illustrating a program module according to various embodiments.

FIG. 11 is a block diagram of a program module according to an embodiment of the present disclosure. A program module 1110 (e.g., the program 940) can include an OS for controlling a resource relating to an electronic device (e.g., the electronic device 901) and/or various applications (e.g., the application program 947) running on the OS. The OS can include, for example, Android™, iOS™, Windows™, Symbian™, Tizen™, or Bada™. Referring to FIG. 11, the program module 1110 can include a kernel 1120 (e.g., the kernel 941), a middleware 1130 (e.g., the middleware 943), an API 1160 (e.g., the API 945), and/or an application 1170 (e.g., the application program 947). At least part of the program module 1110 can be preloaded on an electronic device or can be downloaded from an external electronic device (e.g., the electronic device 902, 904, or the server 906).

The kernel 1120 includes, for example, at least one of a system resource manager 1121 and/or a device driver 1123. The system resource manager 1121 can control, allocate, or retrieve a system resource. According to an embodiment, the system resource manager 1121 can include a process management unit, a memory management unit, or a file system management unit. The device driver 1123 can include, for example, a display driver, a camera driver, a Bluetooth driver, a sharing memory driver, a USB driver, a keypad driver, a WiFi driver, an audio driver, or an Inter-Process Communication (IPC) driver. The middleware 1130, for example, can provide a function commonly required by the application 1170, or can provide various functions to the application 1170 through the API 1160 in order to allow the application 1170 to efficiently use a limited system resource inside the electronic device. The middleware 1130 includes at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, and a security manager 1152.

The runtime library 1135 can include, for example, a library module used by a complier to add a new function through a programming language while the application 1170 is running. The runtime library 1135 can manage input/output, manage memory, or arithmetic function processing. The application manager 1141, for example, can manage the life cycle of the applications 1170. The window manager 1142 can manage a GUI resource used in a screen. The multimedia manager 1143 can recognize a format for playing various media files and encode or decode a media file by using the codec in a corresponding format. The resource manager 1144 can manage a source code of the application 11740 or a memory space. The power manager 1145 can manage the capacity, temperature, or power of the battery, and determine or provide power information for an operation of the electronic device using corresponding information among the capacity, temperature, and/or power of the battery. The power manager 1145 can operate together with a Basic Input/Output System (BIOS). The database manager 1146 can create, search, or modify a database used in the application 1170. The package manager 1147 can manage installation or updating of an application distributed in a package file format.

The connectivity manger 1148 can manage, for example, a wireless connection. The notification manager 1149 can provide an event, such as incoming messages, appointments, and proximity alerts, to the user. The location manager 1150 can manage location information of an electronic device. The graphic manager 1151 can manage a graphic effect to be provided to the user or a user interface relating thereto. The security manager 1152 can provide, for example, system security or user authentication. The middleware 1130 can include a telephony manager for managing a voice or video call function of the electronic device, or a middleware module for combining various functions of the above-described components. The middleware 1130 can provide a module specialized for each type of OS. The middleware 1130 can dynamically delete part of the existing components or add new components. The API 1160, as a set of API programming functions, can be provided as another configuration according to the OS. For example, Android or iSO can provide one API set for each platform, and Tizen can provide two or more API sets for each platform.

The application 1170 can include at least one of a home 1171, a dialer 1172, an SMS/Multimedia Messaging System (MMS) 1173, an Instant Message (IM) 1174, a browser 1175, a camera 1176, an alarm 1177, a contact 1178, a voice dial 1179, an e-mail 1180, a calendar 1181, a media player 1182, an album 1183, a clock 1184, health care (e.g., measure an exercise amount or blood sugar level), or environmental information (e.g., air pressure, humidity, or temperature information) provision application. The application 1170 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 1170 can include a specified application (e.g., a health care application of a mobile medical device) according to a property of the external electronic device. The application 1170 can include an application received from an external electronic device. At least part of the program module 1110 can be implemented (e.g., executed) with software, firmware, hardware (e.g., the processor 1010), or a combination of at least two of them, and include a module, a program, a routine, a set of instructions, or a process for executing one or more functions.

The electronic device according to various embodiments of the present disclosure may improve radiation performance when the electronic device transmits wireless signals by simultaneously using a plurality of antennas. The electronic device according to various embodiments of the present disclosure may prevent a call drop and minimize a mute phenomenon in which user's speaking is inaudible to a counterpart (user's speaking is not transmitted to the BS). The electronic device according to various embodiments of the present disclosure may provide a beamforming function to make the radiation direction of the electronic device face the BS by appropriately adjusting the phase and/or the strength (power) of a plurality of transmission signals transmitted through a plurality of antennas. The electronic device according to various embodiments of the present disclosure may minimize the influence of a wireless signal on a human body by reducing a Specific Absorption Rate (SAR).

The term "module", as used herein, can imply a unit including hardware, software, and firmware, or any suitable combination. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an embodiment of the present disclosure, can include at least one of an Application-Specific Integrated Circuit (ASIC) chip, a Field-Programmable Gate Arrays (FPGAs), and a programmable-logic device, which are known or will be developed and which perform certain operations.

At least some parts of a device (e.g., modules or functions thereof) or a method (e.g., operations), based on embodiments of the present disclosure, can be implemented with an instruction stored in a non-transitory computer-readable storage medium (e.g., the memory 930) as a program module. When the instruction is executed by a processor (e.g., the processor 920), the processor can perform a function corresponding to the instruction. The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter.

The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

What is claimed is:

1. An electronic device comprising:
    a housing;
    a first antenna configured to form a first part of the housing;
    a second antenna configured to form a second part of the housing; and
    at least one processor including a first transmission terminal and a second transmission terminal connected to the first antenna and the second antenna, respectively,
    wherein the at least one processor is further configured to:
        identify a strength of at least one of a transmission signal and a reception signal when transmission of a wireless signal is requested,
        control at least one of a phase and a strength of wireless signals output through at least one of the first transmission terminal and the second transmission terminal according to a result of the identification,
        transmit the first transmission signal through the first antenna, and
        selectively transmit a second transmission signal, which is identical to the first transmission signal but has at least one of a different phase and a different strength than the first transmission signal, through the second antenna based on the strength of at least one of the transmission signal and the reception signal.

2. The electronic device of claim 1, wherein the at least one processor is further configured to:
    transmit a first transmission signal through one of the first antenna and the second antenna and not transmit the wireless signal through a remaining one thereof when a strength of the transmission signal is smaller than a preset first threshold value and a strength of the reception signal is larger than a preset second threshold value, and
    transmit the first transmission signal through the first antenna and transmit a second transmission signal, which is identical to the first transmission signal but has at least one of a different phase and a different strength than the first transmission signal, through the second antenna when the strength of the transmission signal is greater than or equal to the first threshold value or the strength of the reception signal is less than or equal to the second threshold value.

3. The electronic device of claim 2, wherein the at least one processor is further configured to output the first transmission signal and the second transmission signal through the first transmission terminal and the second transmission terminal, respectively.

4. The electronic device of claim 3, wherein the at least one processor includes a phase shifter for shifting the phase of the first transmission signal thereby generating the second transmission signal.

5. The electronic device of claim 1, further comprising a third antenna,
wherein, when multiple bands are supported, the at least one processor is further configured to transmit a first transmission signal in a first band through the first antenna and transmit a second transmission signal in the first band through the second antenna or the third antenna.

6. An electronic device comprising:
a housing:
a first antenna configured to form a first part of the housing;
a second antenna configured to form a second part of the housing, and
at least one processor including a first transmission terminal and second transmission terminal connected to the first antenna and the second antenna, respectively,
wherein the at least one processor is further configured to:
identify a radiation direction of the electronic device,
identify whether the identified radiation direction of the electronic device faces a base station, and,
when the radiation direction does not face the base station, adjust at least one of the phase and the strength of at least some of a plurality of transmission signals to make the radiation direction face a direction of the base station.

7. The electronic device of claim 6, further comprising a sensor module including a plurality of sensors for identifying a rear surface direction of the electronic device,
wherein the at least one processor is further configured to extract the radiation direction of the electronic device in a pre-stored default state and identify a current radiation direction of the electronic device based on the extracted radiation direction and the identified rear surface direction of the electronic device.

8. The electronic device of claim 6, further comprising a location information reception module for receiving information on a current location of the electronic device,
wherein the at least one processor is further configured to receive location information of the base station and calculate a direction of the base station with respect to the electronic device based on information on the received current location of the electronic device and the received location information of the base station.

9. The electronic device of claim 6, further comprising a memory configured to store a phase information database to which phase information for each antenna for adjusting at least one of a phase and a strength of at least some of a plurality of transmission signals is mapped.

10. An electronic device comprising:
a housing;
a first antenna configured to form a first part of the housing;
a second antenna configured to form a second part of the housing; and
at least one processor including a plurality of reception terminals for receiving wireless signals through the first antenna and the second antenna and one transmission terminal for outputting a wireless signal to be output through at least one of a plurality of antennas,
wherein the at least one processor is further configured to:
identify a strength of at least one of a transmission signal and a reception signal when transmission of the wireless signal is requested, and
transmit the transmission signal, which is output through the transmission terminal, through the first antenna via a first path or to transmit and output the transmission signal to the first antenna through the first path and output the same transmission signal to the second antenna through a second path for changing at least one of a phase and a strength of the same transmission signal.

11. The electronic device of claim 10, wherein the at least one processor is further configured to:
transmit the transmission signal through the first antenna and to not transmit the transmission signal through the second antenna when a strength of the transmission signal is smaller than a preset first threshold value and a strength of the reception signal is larger than a preset second threshold value, and
transmit the transmission signal to the first antenna and the second antenna through the first path and the second path when the strength of the transmission signal is larger than or equal to the first threshold value or when the strength of the reception signal is equal to or smaller than the second threshold value.

12. The electronic device of claim 10, wherein the first path includes a first power amplifier for amplifying a transmission signal output from the transmission terminal, a first transmission/reception separator for filtering the amplified transmission signal, and a coupler for transmitting the filtered transmission signal to the first antenna and acquiring a reflected signal of the transmission signal, and the second path includes the coupler, a phase shifter for shifting a phase of the reflected signal acquired from the coupler, a second power amplifier for amplifying the reflected signal having the shifted phase, and a second transmission/reception separator for filtering the amplified signal and transmitting the filtered signal to the second antenna.

13. The electronic device of claim 10, wherein the first path includes a first switch for switching a transmission signal output from the transmission terminal, a first power amplifier connected to the first switch, and a first transmission/reception separator for filtering the transmission signal amplified by the first power amplifier and transmitting the filtered transmission signal to the first antenna, and the second path includes a second switch for switching the transmission signal output from the transmission terminal, a phase shifter for shifting a phase of the transmission signal received through the second switch, a second power amplifier for amplifying a reflected signal having the shifted phase, and a second transmission/reception separator for filtering the signal amplified by the second power amplifier and transmitting the filtered signal to the second antenna.

14. The electronic device of claim 10, further comprising:
a sensor module including a plurality of sensors for identifying a position of the electronic device; and a location information reception module configured to receive location information of the electronic device, wherein the at least one processor is further configured to receive location information of a base station, calculate a base station direction of the base station with respect to the electronic device based on the received location information of the electronic device and the received location information of the base station, identify a current radiation direction of the electronic device based on a radiation direction of the electronic device in a pre-stored default state and the identified position of the electronic device to identify whether the current radiation direction of the electronic device matches the calculated base station direction, and, when the current radiation direction of the electronic device does not match the calculated base station direction based on a result of the identification, control the radiation direction of the electronic device by adjusting at least one of a phase and a strength of at least one of a first transmission signal and the second transmission signal.

15. A method of transmitting a wireless signal by an electronic device comprising a first antenna and a second antenna, the method comprising:
identifying a strength of at least one of a transmission signal and a reception signal in response to a request to transmit a wireless signal; and
controlling at least one of a phase and a strength of at least one transmission signal output from a communication processor based on a result of the identification,
transmitting the first transmission signal through the first antenna, and
selectively transmitting a second transmission signal, which is identical to the first transmission signal but has at least one of a different phase and a different strength than the first transmission signal, through the second antenna based on the strength of at least one of the transmission signal and the reception signal.

16. The method of claim 15, wherein the controlling of at least one of the phase and the strength comprises:
performing control to transmit the transmission signal through one of the first antenna and the second antenna and not transmit the wireless signal through a remaining one thereof when a strength of the transmission signal is smaller than a preset first threshold value and a strength of the reception signal is equal to or smaller than a preset second threshold value; and
transmitting a first transmission signal and a second transmission signal, having at least one of a different phase and a different strength, through the first antenna and the second antenna when the strength of the transmission signal is larger than or equal to the first threshold value or the strength of the reception signal is equal to or smaller than the second threshold value.

17. The method of claim 16, further comprising:
identifying a radiation direction of the electronic device;
identifying whether the identified radiation direction faces a base station; and
when the identified radiation direction does not face the base station, adjusting at least one of a phase and a size of at least one of the first transmission signal and the second transmission signal such that the radiation direction faces the base station.

18. The method of claim 17, wherein the identifying of the radiation direction of the electronic device comprises:
extracting a radiation direction of the electronic device in a pre-stored default state;
identifying a position of the electronic device through a plurality of sensors; and
identifying a current radiation direction of the electronic device based on the extracted radiation direction and the identified position, and
the identifying of whether the identified radiation direction faces the base station comprises:
identifying a current location of the electronic device;
receiving a location of the base station; and
calculating a direction of the base station with respect to the electronic device based on the acquired current location of the electronic device and the received location of the base station.

19. The method of claim 15, wherein the controlling of at least one of the phase and the strength comprises outputting a first transmission signal and a second transmission signal, having a phase different from a phase of the first transmission signal, through a first transmission terminal and a second transmission terminal included in the communication processor, respectively, and transmitting the first transmission signal and the second transmission signal through the first antenna and the second antenna, respectively.

20. The method of claim 15, wherein the controlling of at least one of the phase and the strength comprises:
transmitting a transmission signal output through one transmission terminal included in the communication processor through the first antenna as a first transmission signal; and
acquiring a reflected signal of the first transmission signal from the first antenna, changing at least one of a phase and a size of the acquired reflected signal, and transmitting the reflected signal having at least one of the changed phase and size through the second antenna as a second transmission signal.

21. The method of claim 15, wherein the controlling of at least one of the phase and the strength comprises:
outputting a transmission signal through one transmission terminal included in the communication processor; and
performing switching such that the output transmission signal is transmitted, as a first transmission signal, through the first antenna via a first transmission path and such that at least one of a phase and a size of the output transmission signal is changed and the changed transmission signal is transmitted, as a second transmission signal, through the second antenna via a second transmission path.

* * * * *